United States Patent
Izumi et al.

(10) Patent No.: US 10,412,413 B2
(45) Date of Patent: Sep. 10, 2019

(54) IMAGE PROCESSING DEVICE AND IMAGE PROCESSING METHOD

(71) Applicants: SONY CORPORATION, Tokyo (JP); SONY INTERACTIVE ENTERTAINMENT INC., Tokyo (JP)

(72) Inventors: Nobuaki Izumi, Kanagawa (JP); Yuji Ando, Kanagawa (JP); Takayuki Shinohara, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/546,364

(22) PCT Filed: Feb. 17, 2016

(86) PCT No.: PCT/JP2016/054502
§ 371 (c)(1),
(2) Date: Jul. 26, 2017

(87) PCT Pub. No.: WO2016/140060
PCT Pub. Date: Sep. 9, 2016

(65) Prior Publication Data
US 2018/0027257 A1  Jan. 25, 2018

(30) Foreign Application Priority Data
Mar. 5, 2015 (JP) .................. 2015-043617

(51) Int. Cl.
*G11B 27/00* (2006.01)
*H04N 5/93* (2006.01)
(Continued)

(52) U.S. Cl.
CPC ......... *H04N 19/597* (2014.11); *G06T 3/4092* (2013.01); *G06T 9/00* (2013.01);
(Continued)

(58) Field of Classification Search
USPC .............. 386/280, 278, 300; 348/42, 47, 48; 359/725
See application file for complete search history.

(56) References Cited

U.S. PATENT DOCUMENTS 8,264,524 B1 * 9/2012 Davey ................ H04N 5/23206
348/36
8,791,984 B2 * 7/2014 Jones ............... G08B 13/19641
348/36
(Continued)

FOREIGN PATENT DOCUMENTS

EP   2592839 A1   5/2013
JP   2001-298652   10/2001
(Continued)

OTHER PUBLICATIONS

Ishikawa, et al., Novel View Telepresence With High-Scalability Using Multi-Casted Omni-Directional Videos, 9th International Conference on Enterprise Information Systems, vol. HCI, Funchal, Portugal, Jun. 12-16, 2007, pp. 148-156.
(Continued)

*Primary Examiner* — Daquan Zhao
(74) *Attorney, Agent, or Firm* — Paratus Law Group, PLLC

(57) ABSTRACT

There is provided an encoder that enables an image of a field-of-view range of a user to be displayed immediately. The encoder encodes, for a pair of opposite surfaces among a plurality of surfaces of a model for an omnidirectional image, a first composite image obtained by combining an omnidirectional image of a first surface of a high resolution and an omnidirectional image of a second surface of a resolution lower than the high resolution and a second composite image obtained by combining an omnidirectional image of the second surface of the high resolution and an omnidirectional image of the first surface of a low resolu-
(Continued)

tion. For example, the present disclosure can be applied to an image display system or the like.

22 Claims, 24 Drawing Sheets

(51) Int. Cl.
| | |
|---|---|
| *H04N 9/70* | (2006.01) |
| *H04N 13/00* | (2018.01) |
| *H04N 19/597* | (2014.01) |
| *G06T 9/00* | (2006.01) |
| *H04N 21/2343* | (2011.01) |
| *H04N 21/4402* | (2011.01) |
| *H04N 21/4728* | (2011.01) |
| *H04N 19/167* | (2014.01) |
| *H04N 19/177* | (2014.01) |
| *H04N 19/186* | (2014.01) |
| *G06T 3/40* | (2006.01) |
| *G02B 13/06* | (2006.01) |

(52) U.S. Cl.
CPC ........... *H04N 13/00* (2013.01); *H04N 19/167* (2014.11); *H04N 19/177* (2014.11); *H04N 19/186* (2014.11); *H04N 21/2343* (2013.01); *H04N 21/4402* (2013.01); *H04N 21/4728* (2013.01)

(56) References Cited

U.S. PATENT DOCUMENTS

| | | | |
|---|---|---|---|
| 2004/0086186 A1* | 5/2004 | Kyusojin | H04N 5/23238 382/232 |
| 2010/0302367 A1* | 12/2010 | Hsu | G06T 7/20 348/143 |
| 2014/0087867 A1 | 3/2014 | Hightower | |
| 2016/0012855 A1* | 1/2016 | Krishnan | G11B 27/105 386/241 |

FOREIGN PATENT DOCUMENTS

| | | |
|---|---|---|
| JP | 2002-312778 | 10/2002 |
| JP | 2006-014174 | 1/2006 |
| WO | WO2005/112448 A2 | 11/2005 |

OTHER PUBLICATIONS

Yamamoto, et al., PanoVi: Panoramic Movie System for Real-Time Network Transmission, Multimedia Signal Processing, 2001 IEEE Fourth Workshop, Oct. 3-5, 2001, Cannes, France, pp. 389-394.

Oct. 2, 2018, European Search Report issued for related EP application No. 16758754.2.

Emori et al., Study on free viewpoint video streaming using mixed resolution multi-view video and low resolution depth maps, International Organization for Standardization ISO/IEC JTC1/SC29/WG11 Coding of Moving Pictures and Audio, Oct. 2014, pp. 1-14, Strasbourg, France.

* cited by examiner

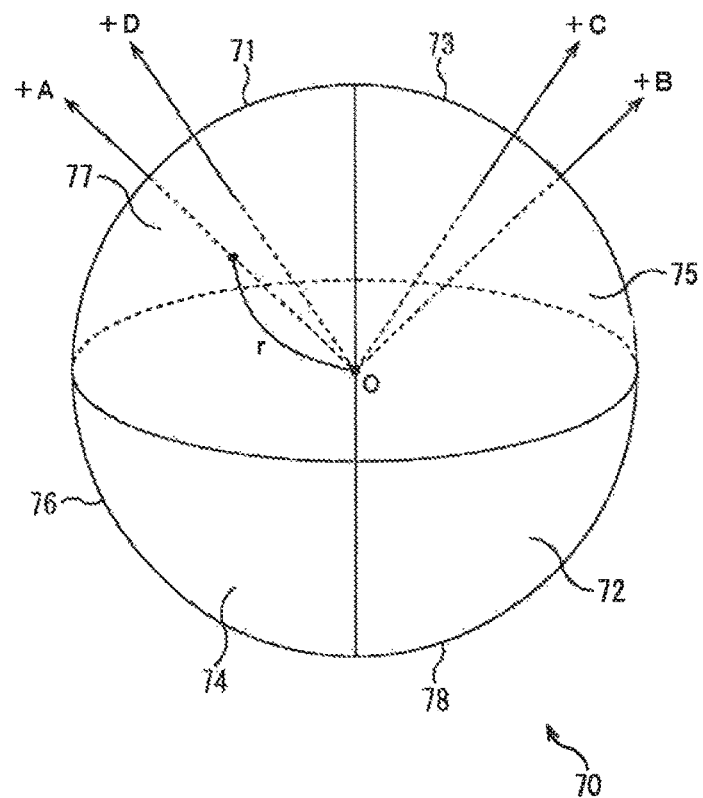

FIG.25

| PATTERN | HIGH-RESOLUTION IMAGE | LOW-RESOLUTION IMAGE |
|---|---|---|
| 1 | CUBE MAPPING | EQUIDISTANT CYLINDRICAL PROJECTION |
| 2 | CUBE MAPPING | CUBE MAPPING |
| 3 | EQUIDISTANT CYLINDRICAL PROJECTION | EQUIDISTANT CYLINDRICAL PROJECTION |
| 4 | EQUIDISTANT CYLINDRICAL PROJECTION | CUBE MAPPING |

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2016/054502 (filed on Feb. 17, 2016) under 35 U.S.C. § 371, which claims priority to Japanese Patent Application No. 2015-043617 (filed on Mar. 5, 2015), which are all hereby incorporated by reference in their entirety.

TECHNICAL FIELD

The present disclosure relates to an image processing device and an image processing method, and more particularly, to an image processing device and an image processing method, which are capable of immediately displaying an image of a field-of-view range of a user.

BACKGROUND ART

A recording device that generates an omnidirectional image obtained by mapping an image of a 360° range in a horizontal direction and an image of a 180° range in a vertical direction to a 2D image (a planar image) from captured images in all directions captured by multiple cameras and encodes and records the omnidirectional image is known (for example, see Patent Literature 1.

In such a recording device, as a method of generating the omnidirectional image, a method of performing mapping from a 3D image to a 2D image such as equidistant cylindrical projection or cube mapping is used. When the equidistant cylindrical projection is used as the method of generating the omnidirectional image, the omnidirectional image is an image obtained by performing the equidistant cylindrical projection on a sphere in which a captured image is mapped to a surface of the sphere. Further, when the cube mapping is used as the method of generating the omnidirectional image, the omnidirectional image is an image of a development view of a cube in which a captured image is mapped to a surface of the cube.

On the other hand, a reproducing device that decodes an encoded stream of an omnidirectional image recorded by a recording device and displays an image of a field-of-view range of a user using the omnidirectional image obtained as a result is known. Such a reproducing device attaches the omnidirectional image to a surface of a 3D model such as a sphere or a cube as a texture and displays the image of the field-of-view range of the user when the texture of the surface of the 3D model in a direction of a line-of-sight vector of the user is viewed from one point in the 3D model. Accordingly, the captured image of the field-of-view range of the user is reproduced.

This reproduction method is referred to as an "environmental light model" in the field of computer graphics (CG). Further, the environment light model of attaching an image generated by the equidistant cylindrical projection to the surface of the sphere is referred to as a "sphere model," and the environment light model of attaching an image generated by the cube mapping to the surface of the cube surface is referred to as a "cube model."

The captured image of the field-of-view range of the user can be reproduced using only an area corresponding to the line-of-sight vector of the user in the omnidirectional image. For example, when a viewing angle in the horizontal direction is 90°, in the horizontal direction, only ¼ of the omnidirectional image to which the images in all directions in a 360° range in the horizontal direction are mapped is used for reproduction of the captured image of the field-of-view range of the user. The sample applies to the vertical direction.

Therefore, it is wasteful to decode the encoded streams of the entire omnidirectional image. However, since the line-of-sight vector is decided by the user, the recording device is unable to encode only the area corresponding to the line-of-sight vector in the omnidirectional image.

Further, when the omnidirectional image is encoded in accordance with a general encoding scheme such as Moving Picture Experts Group phase 2 (MPEG 2) or Advanced Video Coding (AVC)/H.264, encoding is performed using information of the entire screen. Therefore, it is difficult to decode only the encoded stream of the area corresponding to the line-of-sight vector of the user from the encoded stream in which the omnidirectional image is coded as one image.

In this regard, a technique of reducing a decoding process amount by dividing and encoding an omnidirectional image through a recording device and decoding only the encoded streams of the divided areas corresponding to the line-of-sight vector of the user through a reproducing device is considered (for example, see Patent Literatures 2 and 3).

CITATION LIST

Patent Literature

Patent Literature 1: JP 2006-14174A
Patent Literature 2: JP 2001-298652A
Patent Literature 3: JP 2002-312778A

DISCLOSURE OF INVENTION

Technical Problem

However, in general encoding schemes such as MPEG 2 and AVC, encoding is performed using a correlation in a time direction. Therefore, an encoded stream of a decoding target is unable to be switched at a position other than randomly accessible positions such as the head of a group of pictures (GOP), an IDR picture, and a random access point. Further, since compression efficiency is further improved as an interval of the randomly accessible positions increases, it is difficult to reduce the interval of the randomly accessible positions sufficiently.

Therefore, when the line-of-sight vector of the user is abruptly changed, it is difficult to immediately display the image of the field-of-view range of the user using the omnidirectional image of the area corresponding to the changed line-of-sight vector. As a result, the image of the field-of-view range before the change is displayed, or a part of the image of the field-of-view range after the change is not displayed.

The present disclosure was made in light of the foregoing, and it is desirable to be able to immediately display the image of the field-of-view range of the user.

Solution to Problem

An image processing device according to a first aspect of the present disclosure is an image processing device including: an encoding unit configured to encode, for a pair of opposite surfaces among a plurality of surfaces of a model for an omnidirectional image, a first composite image obtained by combining the omnidirectional image of a first surface of a first resolution and the omnidirectional image of a second surface of a second resolution lower than the first resolution and a second composite image obtained by combining the omnidirectional image of the second surface of the first resolution and the omnidirectional image of the first surface of the second resolution.

The image processing method of the first aspect of the present disclosure corresponds to the image processing device of the first aspect of the present disclosure.

According to the first aspect of the present disclosure, for a pair of opposite surfaces among a plurality of surfaces of a model for an omnidirectional image, a first composite image obtained by combining the omnidirectional image of a first surface of a first resolution and the omnidirectional image of a second surface of a second resolution lower than the first resolution and a second composite image obtained by combining the omnidirectional image of the second surface of the first resolution and the omnidirectional image of the first surface of the second resolution are encoded.

An image processing device according to a second aspect of the present disclosure is an image processing device including: a decoding unit configured to decode, for a pair of opposite surfaces among a plurality of surfaces of a model for an omnidirectional image, an encoded stream obtained by combining the omnidirectional image of a first resolution of a surface corresponding to a line-of-sight direction of a user out of an encoded stream of a first composite image obtained by combining the omnidirectional image of a first surface of the first resolution and the omnidirectional image of a second surface of a second resolution lower than the first resolution and an encoded stream of a second composite image obtained by combining the omnidirectional image of the second surface of the first resolution and the omnidirectional image of the first surface of the second resolution.

The image processing method of the second aspect of the present disclosure corresponds to the image processing device of the second aspect of the present disclosure.

According to the second aspect of the present disclosure, for a pair of opposite surfaces among a plurality of surfaces of a model for an omnidirectional image, an encoded stream obtained by combining the omnidirectional image of a first resolution of a surface corresponding to a line-of-sight direction of a user out of an encoded stream of a first composite image obtained by combining the omnidirectional image of a first surface of the first resolution and the omnidirectional image of a second surface of a second resolution lower than the first resolution and an encoded stream of a second composite image obtained by combining the omnidirectional image of the second surface of the first resolution and the omnidirectional image of the first surface of the second resolution are decoded.

The image processing devices of the first and second aspects can be implemented by causing a computer to execute a program.

Further, in order to implement the image processing devices of the first and second aspects, the program to be executed by the computer may be transmitted via a transmission medium and provided or may be recorded in a recording medium and provided.

The image processing devices of the first and second aspect may be independent devices or may be internal blocks constituting a single device.

Advantageous Effects of Invention

According to the first aspect of the present disclosure, it is possible to encode an omnidirectional image. Further, according to the first aspect of the present disclosure, it is possible to generate an encoded stream that enables an image of a field-of-view range of a user to be displayed immediately.

According to the second aspect of the present disclosure, it is possible to decode an encoded stream of an omnidirectional image. Further, according to the second aspect of the present disclosure, it is possible to enable an image of the field-of-view range of a user to be displayed immediately.

Further, the effects described herein are not necessarily limited, and any effect described in the present disclosure may be included.

BRIEF DESCRIPTION OF DRAWINGS

FIG. 4 is a perspective view illustrating a sphere as a 3D model.

FIG. 5 is a diagram illustrating an example of an omnidirectional image generated by equidistant cylindrical projection.

FIG. 25 is a diagram for describing a method of generating omnidirectional images corresponding to a high-resolution image and a low-resolution image according to the present disclosure.

MODE(S) FOR CARRYING OUT THE INVENTION

Figure 26:
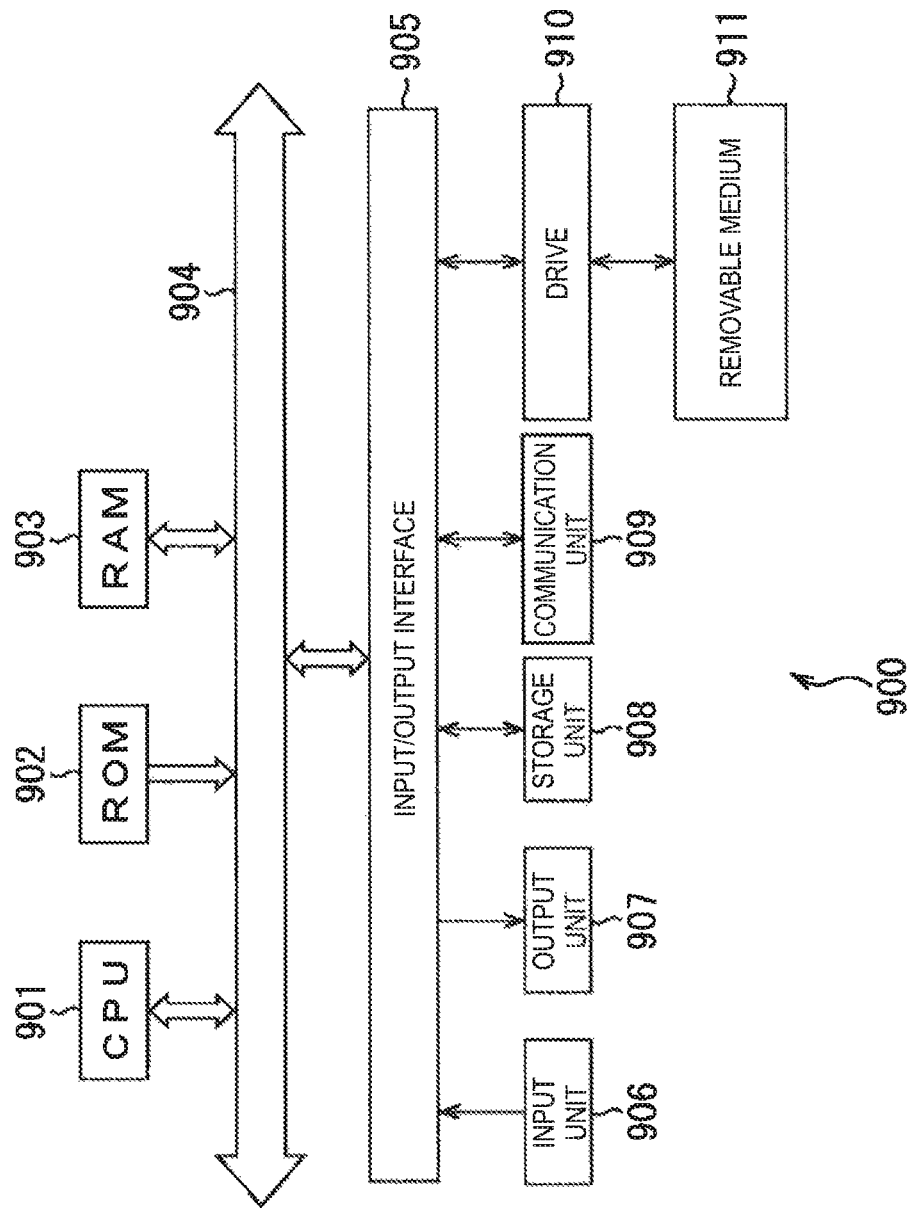
FIG. 26 is a block diagram illustrating an exemplary configuration of hardware of a computer.

Hereinafter, the premise of the present disclosure and modes for carrying out the present disclosure (hereinafter referred to as "embodiments") will be described. Further, description will proceed in the following order.
0. Premise of present disclosure (FIGS. 1 to 6)
1. First embodiment: image display system (FIGS. 7 to 17)
2. Second embodiment: image display system (FIG. 18)
3. Third embodiment: image display system (FIGS. 19 to 23)
4. Fourth embodiment: image display system (FIG. 24)
5. Method of generating omnidirectional image according to present disclosure (FIG. 25).
6. Fifth embodiment: computer (FIG. 26)

<Premise of Present Disclosure>
(Description of Cube Mapping)

Figure 1:
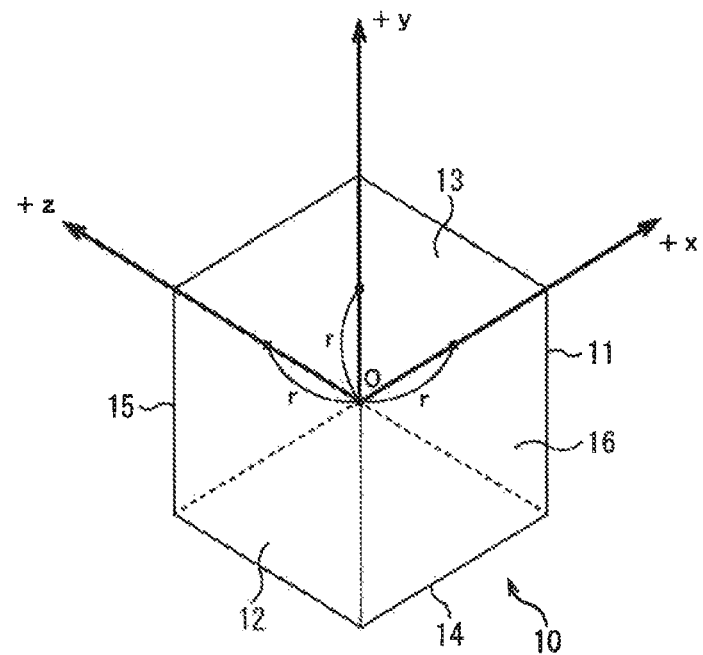
FIG. 1 is a perspective view illustrating a cube serving as a 3D model.

FIG. 1 is a perspective view illustrating a cube serving as a 3D model to which an image is mapped when the cube mapping is used as the method of generating the omnidirectional image.

As illustrated in FIG. 1, when the cube mapping is used as the method of generating the omnidirectional image, an image is mapped to six surfaces 11 to 16 of a cube 10.

In this specification, an axis which passes through an origin O serving as the center of the cube 10 and is orthogonal to the surface 11 and the surface 12 is referred to as an x axis, an axis which is orthogonal to the surface 13 and the surface 14 is referred to as a y axis, and an axis which is orthogonal to the surface 15 and the surface 16 is referred to as a z axis. Further, when a distance between the origin O and each of the surfaces 11 to 16 is "r," the surface 11 in which x=r is also referred to appropriately as a +x surface 11, and the surface 12 in which x=−r is also referred to appropriately as a −x surface 12. Similarly, the surface 13 in which y=r, the surface 14 in which y=−r, the surface 15 in which z=r, and the surface 16 in which z=−r are also referred to appropriately as a +y surface 13, a −y surface 14, a +z surface 15, and a −z surface 16, respectively.

The +x surface 11 and the −x surface 12, the +y surface 13 and the −y surface 14, and the +z surface 15 and the −z surface 16 are opposite to each other.

Figure 2:
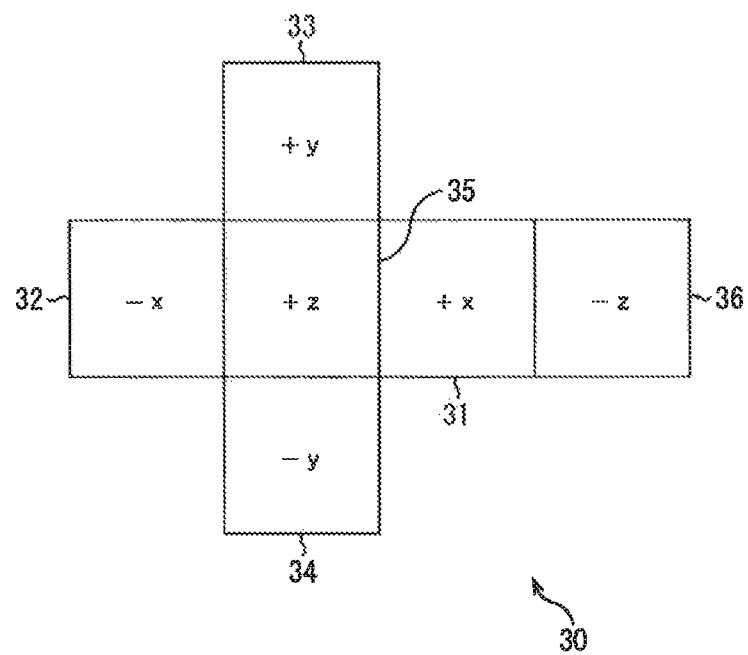
FIG. 2 is a diagram illustrating an example of an omnidirectional image generated by cube mapping.

FIG. 2 is a diagram illustrating an example of the omnidirectional image generated by the cube mapping.

As illustrated in FIG. 2, the omnidirectional image 30 generated by the cube mapping is an image of the development view of the cube 10. Specifically, the omnidirectional image 30 is an image in which an image 32 of the −x surface 12, an image 35 of the +z surface 15, an image 31 of the +x surface 11, and an image 36 of the −z surface 16 are arranged in order from the left at the center, an image 33 of the +y surface 13 is arranged above the image 35, and an image 34 of the −y surface 14 is arranged below the image 35.

Figure 3:
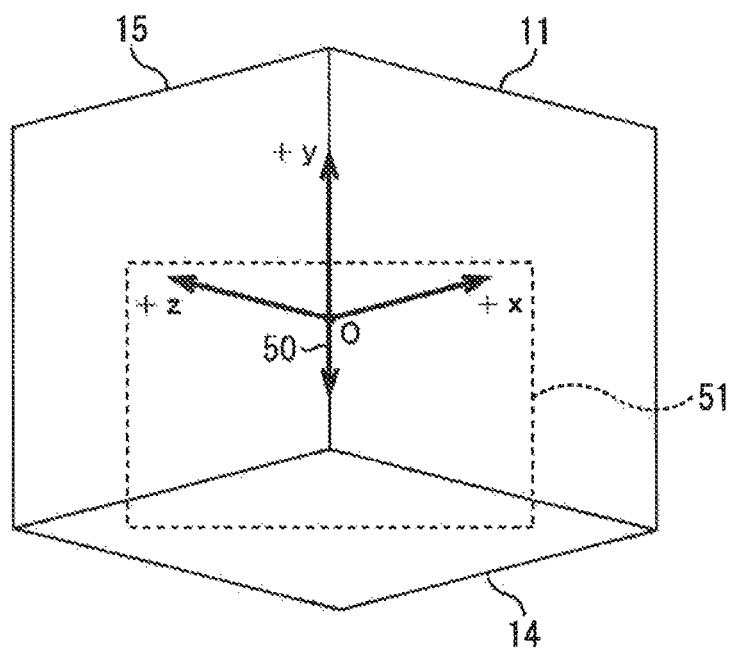
FIG. 3 is a diagram illustrating an example of an image of a field-of-view range of a user generated using the omnidirectional image of FIG. 2.

FIG. 3 is a diagram illustrating an example of the image of the field-of-view range of the user generated using the omnidirectional image 30 of FIG. 2.

In the example of FIG. 3, a line-of-sight vector 50 of the user is a vector in a direction (a line-of-sight direction) which is directed from the origin O to the lower part of the edge at which the +x surface 11 and the +z surface 15 are in contact with each other.

In this case, an image of a field-of-view range 51 of the user can be generated using the image 31 of the +x surface 11, the image 34 of the −y surface 14, and the image 35 of the +z surface 15. In other words, surfaces corresponding to the line-of-sight vector 50 of the user are the +x surface 11 in which positive and negative x axis components and x axis coordinates of the line-of-sight vector 50 are the same, the −y surface 14 in which positive and negative y axis components and y axis coordinates are the same, and the +z surface 15 in which positive and negative z axis components and z axis coordinate are the same.

In this specification, in a pair of opposite surfaces of the omnidirectional image, a surface which is likely to be used for generation of the image of the field-of-view range of the user is referred to as a surface corresponding to the line-of-sight vector of the user.

(Description of Equidistant Cylindrical Projection)

FIG. 4 is a perspective view illustrating a sphere serving as a 3D model to which an image is mapped when the equidistant cylindrical projection is used as the method of generating the omnidirectional image.

As illustrated in FIG. 4, when the equidistant cylindrical projection is used as the method of generating the omnidirectional image, an image is mapped to a surface of a sphere 70. For example, the surface of the sphere 70 can be divided into eight surfaces 71 to 78 having the same size and shape.

In this specification, an axis which passes through an origin O serving as the center of the sphere 70 and passes through the centers of the surface 71 and the surface 72 is referred to as an A axis, an axis which passes through the centers of the surface 73 and the surface 74 is referred to as a B axis, an axis which passes through the centers of the surface 75 and the surface 76 is referred to as a C axis, and an axis which passes through the centers of the surface 77 and the surface 78 is referred to as a D axis. Further, when the distance between the origin O and each of the surfaces 71 to 78 is "r," the surface 71 in which A=r is also referred to appropriately as a +A surface 71, and the surface 72 in which A=−r is also referred to appropriately as a −A surface 72, Similarly, the surface 73 in which B=r, the surface 74 in which B=−r, the surface 75 in which C=r, the surface 76 in which C=−r, the surface 77 in which D=r, and the surface 78 in which D=−r are also referred to appropriately as a +B surface 73, a −B surface 74, a +C surface 75, a −C surface 76, a +D surface 77, and a −D surface 78.

The +A surface 71 and the −A surface 72, the +B surface 73 and the −B surface 74, the +C surface 75 and the −C surface 76, and the +D surface 77 and the −D surface 78 are opposite to each other.

FIG. 5 is a diagram illustrating an example of the omnidirectional image generated by the equidistant cylindrical projection.

As illustrated in FIG. 5, an omnidirectional image 90 generated by the equidistant cylindrical projection is an image obtained by performing the equidistant cylindrical projection on the sphere 70. In other words, horizontal coordinates and vertical coordinates of the omnidirectional image 90 correspond to a longitude and a latitude when the sphere 70 is assumed to be a globe.

Specifically, the omnidirectional image 90 is an image in which an image 91 of the +A surface 71, an image 93 of the +B surface 73, an image 95 of the +C surface 75, and an image 97 of the +D surface 77 are arranged in order from the left in the upper portion, and an image 96 of the −C surface 76, an image 98 of the −D surface 78, an image 92 of the −A surface 72, and an image 94 of the −B surface 74 are arranged in order from the left in the lower portion.

Figure 6:
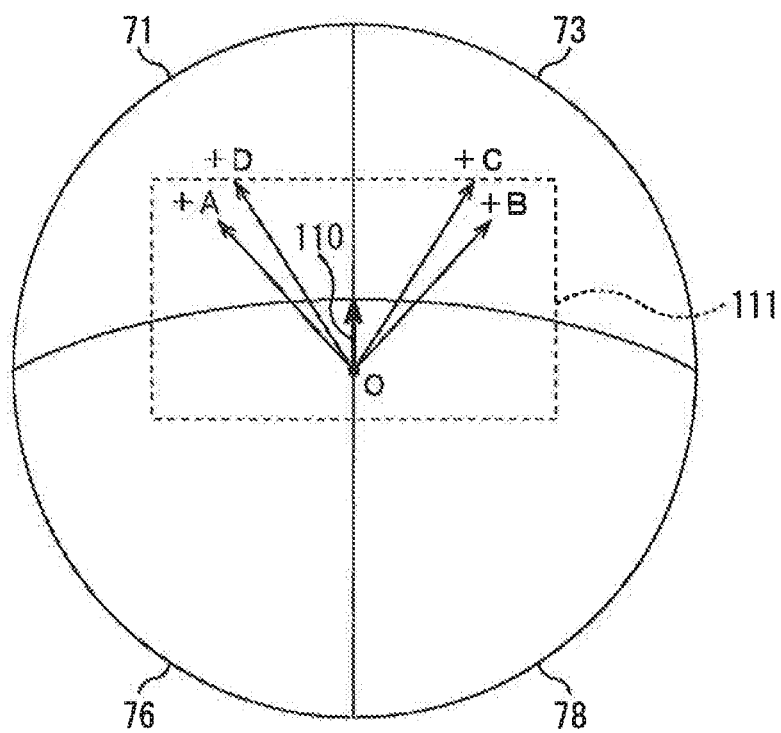
FIG. 6 is a diagram illustrating an example of an image of a field-of-view range of a user generated using the omnidirectional image of FIG. 5.

FIG. 6 is a diagram illustrating an example of the image of the field-of-view range of the user generated using the omnidirectional image 90 of FIG. 5.

In the example of FIG. 6, a line-of-sight vector 110 of the user is a vector which is directed from the origin O to intersection points of the +A surface 71, the +B surface 73, the −C surface 76, and the −D surface 78.

In this case, an image of a field-of-view range 111 of the user can be generated using the image 91 of the +A surface 71, the image 93 of the +B surface 73, the image 96 of the −C surface 76, and the image 98 of the −D surface 78. In other words, surfaces corresponding to the line-of-sight vector 110 of the user are the +A surface 71 in which positive and negative A axis components and A axis coordinates of the line-of-sight vector 110 are the same, the +B surface 73 in which positive and negative B axis components and B axis coordinates are the same, the −C surface 76 in which positive and negative C axis components and C axis coordinates are the same, and the −D surface 78 in which positive and negative D axis components and D axis coordinates are the same.

As described above, the image of the field-of-view range of the user is generated using only the image of the surface corresponding to the line-of-sight vector of the user in the omnidirectional image 30 (90). Therefore, a technique of reducing a decoding load by encoding the omnidirectional image 30 (90) in units of surfaces so that only the encoded stream of the image of the surface corresponding to the line-of-sight vector of the user can be decoded is known.

However, in the general encoding schemes such as MPEG and AVC, since encoding is performed by using a correlation in the time direction, the encoded stream of the decoding target is unable to be switched at positions other than the randomly accessible position. Therefore, when the line-of-sight vector of the user is abruptly changed, the image of the field-of-view range of the user is unable to be immediately displayed using the image of the surface corresponding to the line-of-sight vector after the change.

In this regard, a technique of obtaining an omnidirectional image having a high resolution or a low resolution for all surfaces by decreasing the resolution of the omnidirectional image, performing encoding in units of surfaces, and decoding the encoded stream of the omnidirectional image whose resolution is decreased for surfaces not corresponding to the line-of-sight vector is considered.

In this case, for example, when the cube mapping is used as the method of generating the omnidirectional image, high-resolution images of the six surfaces 11 to 16 whose resolution is not decreased and low-resolution images whose resolution is decreased are encoded, and thus a total of 12 encoded streams are generated. Then, among the 12 encoded streams, a total of 6 encoded streams of the high-resolution images of the three surfaces corresponding to the line-of-sight vector and the low-resolution images of the three surfaces not corresponding to the line-of-sight vector are decoded.

As a result, even when the line-of-sight vector is abruptly changed, it is possible to display the image of the field-of-view range of the user on the basis of the low-resolution images of the surfaces until the high-resolution images of the surfaces corresponding to the changed line-of-sight vector are decoded. Therefore, it is possible to immediately display the image of the field-of-view range of the user.

Further, since the encoded stream of the low-resolution image is decoded for the surface not corresponding to the line-of-sight vector, the number of pixels to be decoded is smaller than when the encoded streams of the high-resolution images of all the surfaces are decoded, and thus the decoding processing amount can be reduced.

However, in this case, it is necessary for the decoding device to include six decoders that decode the encoded streams of the respective surfaces. Further, since it is necessary to simultaneously perform switching from one of the encoded stream of the high resolution of the decoding target and the encoded stream of the low resolution to the other between the decoders corresponding to a pair of opposite surfaces, it is difficult to control the switching. Thus, the present technology reduces the number of decoders in the decoding device and facilitates the control of the switching.

<First Embodiment>
(Exemplary Configuration of First Embodiment of Image Display System)

Figure 7:
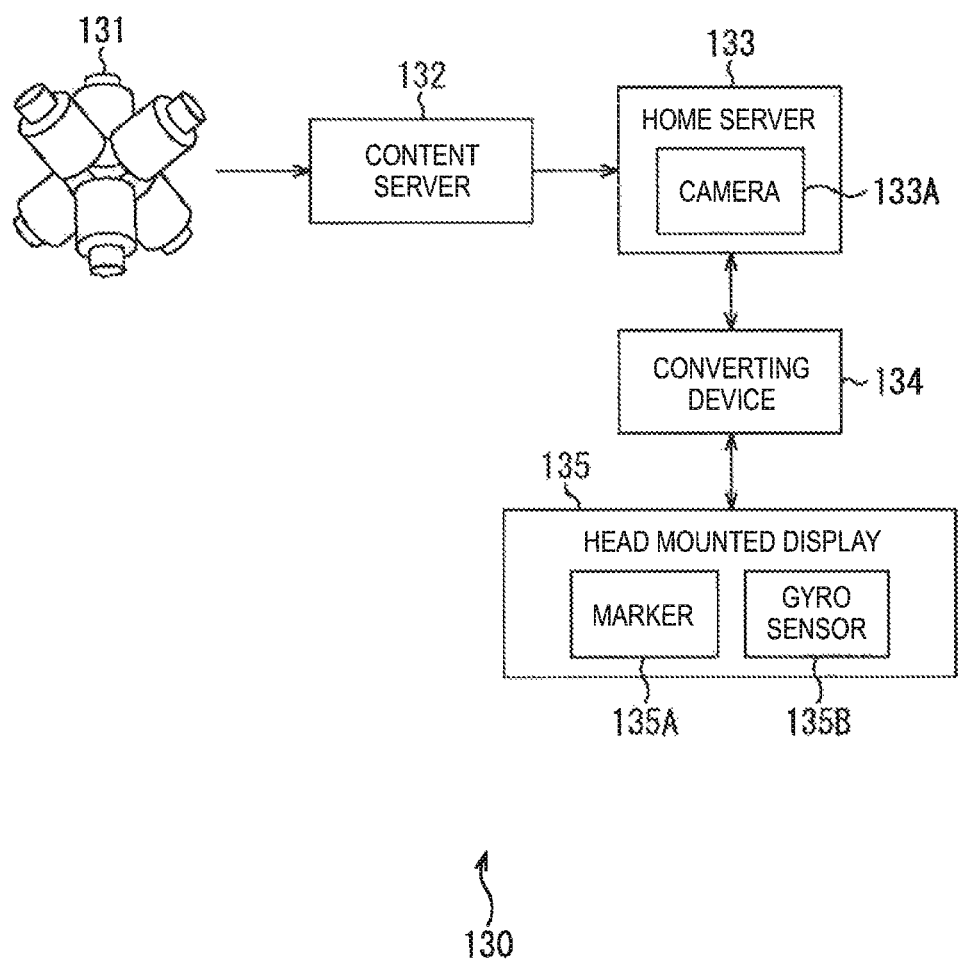
FIG. 7 is a block diagram illustrating an exemplary configuration of a first embodiment of an image display system to which the present disclosure is applied.

FIG. 7 is a block diagram illustrating an exemplary configuration of a first embodiment of the image display system to which the present disclosure is applied.

The image display system 130 of FIG. 7 includes a multi-camera unit 131, a content server 132, a home server 133, a converting device 134, and a head mounted display 135. The image display system 130 generates the omnidirectional image 30 from the captured image captured by the multi-camera unit 131 and displays the image of the field-of-view range of the user in the omnidirectional image 30.

Specifically, the multi-camera unit 131 of the image display system 130 is configured with a plurality of cameras. Each camera performs photography and generates captured images in all directions in units of frames. The multi-camera unit 131 supplies the captured images in all directions to the content server 132.

The content server 132 generates the omnidirectional image 30 from the captured image supplied from the multi-camera unit 131 using the cube mapping. The content server 132 divides the omnidirectional image 30 into the images 31 to 36 of the six surfaces 11 to 16 and decreases the resolution. As a result, the high-resolution images of the surfaces 11 to 16 whose resolution is not decreased and the low-resolution images whose resolution is decreased are generated.

Further, for each pair of opposite surfaces among the surfaces 11 to 16, the content server 132 combines the high-resolution image of one surface of the pair with the low-resolution image of the other surface, and combines the low-resolution image of one surface with the high-resolution image of the other surface.

The content server 132 (image processing device) performs compression encoding on six composite images obtained as a result of synthesis through an encoding scheme such as AVC or High Efficiency Video Coding (HEVC)/ H.265, and generates six encoded streams. The content server 132 records the generated six encoded streams. Further, the content server 132 transmits the recorded six encoded streams to the home server 133 via a network (not illustrated).

The home server 133 receives the six encoded streams transmitted from the content server 132. Further, the home server 133 includes a camera 133A therein and photographs a marker 135A attached to the head mounted display 135. Then, the home server 133 detects the position of the user based on the captured image of the marker 135A. Further, the home server 133 receives a detection result of a gyro sensor 135B of the head mounted display 135 from the head mounted display 135 via the converting device 134.

The home server 133 decides the line-of-sight vector of the user on the basis of the detection result of the gyro sensor 135B, and decides the field-of-view range of the user on the basis of the position of the user and the line-of-sight vector.

The home server 133 decides three surfaces corresponding to the line-of-sight vector of the user among the surfaces 11 to 16. Then, the home server 133 (an image processing device or a terminal) selects three encoded streams of the composite images including the high-resolution images of the surfaces corresponding to the line-of-sight vector of the user among the six encoded streams, and decodes the selected three encoded streams.

Then, the home server 133 generates the image of the field-of-view range of the user from the composite image obtained as a result of decoding as a display image. The home server 133 transmits the display image to the converting device 134 via a High-Definition Multimedia interface (HDMI (a registered trademark)) cable (not illustrated).

The converting device 134 converts coordinates in the display image transmitted from the home server 133 into coordinates in the head mounted display 135. The converting device 134 supplies the display image whose coordinates are converted to the head mounted display 135.

The head mounted display 135 is worn on the head of the user. The head mounted display 135 displays the display image supplied from the converting device 134. The gyro sensor 135B installed in the head mounted display 135 detects an inclination of the head mounted display 135 and transmits a detection result to the home server 133 via the converting device 134.

(Exemplary Configuration of Content Server)

Figure 8:
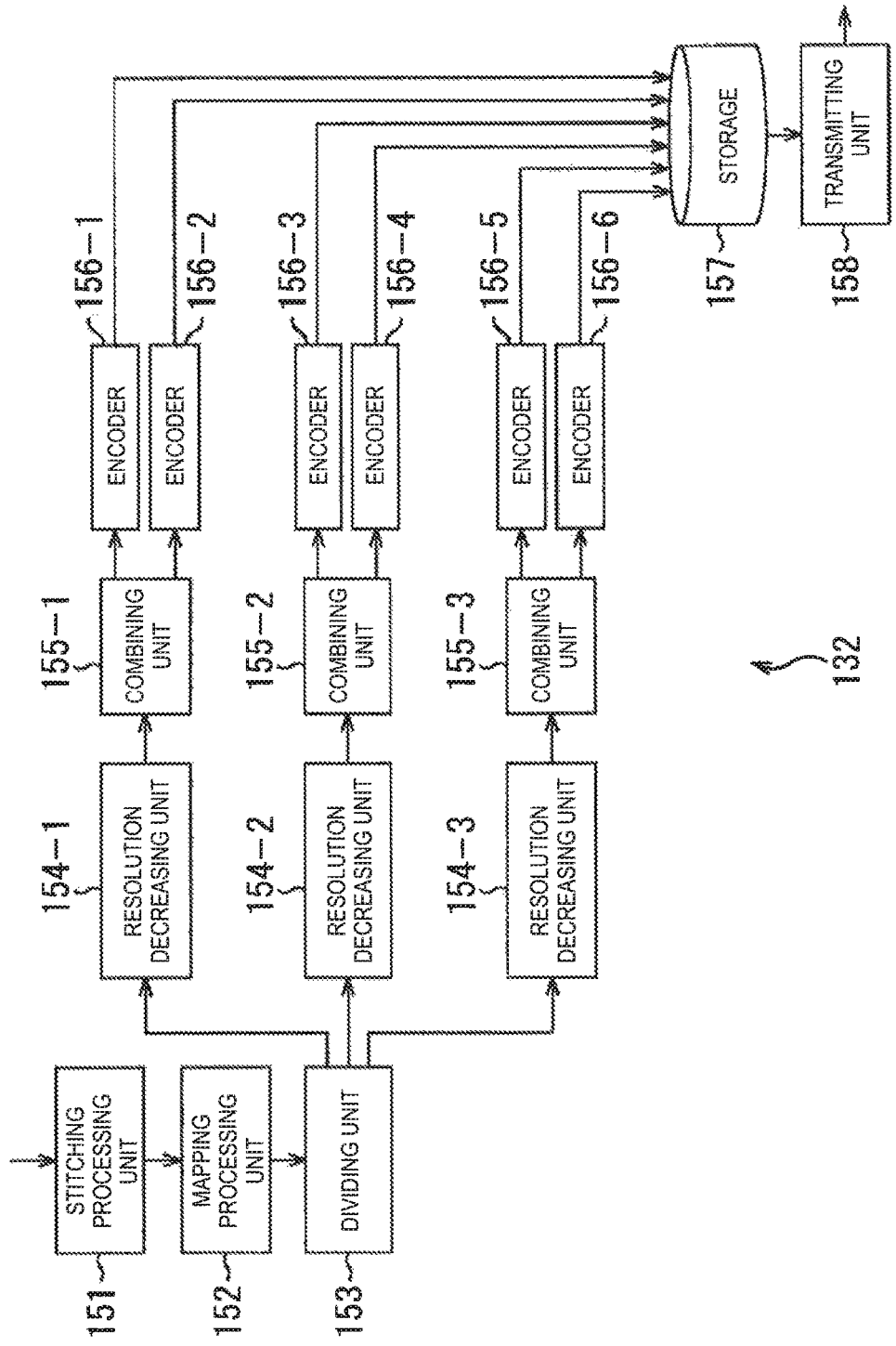
FIG. 8 is a block diagram illustrating an exemplary configuration of a content server of FIG. 7.

FIG. 8 is a block diagram illustrating an exemplary configuration of the content server 132 of FIG. 7.

The content server 132 of FIG. 8 includes a stitching processing unit 151, a mapping processing unit 152, a dividing unit 153, resolution decreasing units 154-1 to 154-3, combining units 155-1 to 155-3, encoders 156-1 to 156-6, a storage 157, and a transmitting unit 158.

The stitching processing unit 151 causes the captured images in all directions supplied from the multi-camera unit 131 of FIG. 7 to have the same color and brightness, removes overlapping thereof, and connects them. The stitching processing unit 151 supplies the resulting captured images to the mapping processing unit 152.

The mapping processing unit 152 generates the omnidirectional image 30 from the captured images supplied from the stitching processing unit 151 by the cube mapping and supplies the omnidirectional image 30 to the dividing unit 153. Further, the stitching processing unit 151 and the mapping processing unit 152 may be integrated.

The dividing unit 153 divides the omnidirectional image 30 supplied from the mapping processing unit 152 into the images 31 to 36 of the six surfaces 11 to 16. The dividing unit 153 supplies the image 31 and the image 32 of the pair of the +x surface 11 and the −x surface 12 which are opposite to each other among the surfaces 11 to 16 to the resolution decreasing unit 154-1, and supplies the image 33 and the image 34 of a pair of the +y surface 13 and the −y surface 14 which are opposite to each other to the resolution decreasing unit 154-2. Further, the dividing unit 153 supplies the image 35 and the image 36 of the pair of the +z surface 15 and the −z surface 16 which are opposite to each other to the resolution decreasing unit 154-3.

The resolution decreasing unit 154-1 supplies the image 31 and the image 32 supplied from the dividing unit 153 to the combining unit 155-1 as the high-resolution images of the +x surface 11 and the −x surface 12 without change, Further, the resolution decreasing unit 154-1 (a converting unit) reduces the resolutions of the image 31 and the image 32 by reducing the resolutions of the image 31 and the image 32 in the horizontal direction and the vertical direction to ½, and generates the low-resolution images of the +x surface 11 and the −x surface 12, The resolution decreasing unit 154-1 supplies the low-resolution images of the +x surface 11 and the −x surface 12 to the combining unit 155-1.

The combining unit 155-1 (a generating unit) combines the high-resolution image of the +x surface 11 and the low-resolution image of the −x surface 12 supplied from the resolution decreasing unit 154-1, generates a composite image (a first composite image) of the +x surface, and supplies the composite image to the encoder 156-1. The combining unit 155-1 combines the high-resolution image of the −x surface 12 and the low-resolution image of the +x surface 11 supplied from the resolution decreasing unit 154-1, generates a composite image (a second composite image) of the −x surface 12, and supplies the composite image to the encoder 156-2.

Similarly to the resolution decreasing unit 154-1, the resolution decreasing unit 154-2 supplies the image 33 and the image 34 supplied from the dividing unit 153 to the combining unit 155-2 as the high-resolution images of the +y surface 13 and the −y surface 14. Similarly to the resolution decreasing unit 154-1, the resolution decreasing unit 154-2 generates the low-resolution images of the +y surface 13 and the −y surface 14 from the image 33 and the image 34, and supplies the low-resolution images to the combining unit 155-2.

The combining unit 155-2 combines the high-resolution image of the +y surface 13 and the low-resolution image of the −y surface 14 supplied from the resolution decreasing unit 154-2, generates a composite image (a first composite image) of the +y surface 13, and supplies the composite image to the encoder 156-3. The combining unit 155-2 combines the high-resolution image of the −y surface 14 and the low-resolution image of the +y surface 13 supplied from the resolution decreasing unit 154-2, generates a composite image (a second composite image) of the −y surface 14, and supplies the composite image to the encoder 156-4.

Similarly to the resolution decreasing unit 154-1, the resolution decreasing unit 154-3 supplies the image 35 and the image 36 supplied from the dividing unit 153 to the combining unit 155-3 as the high-resolution images of the +z surface 15 and the −z surface 16 without change. Similarly to the resolution decreasing unit 154-1, the resolution decreasing unit 154-3 generates the low-resolution images of the +z surface 15 and the −z surface 16 from the image 35 and the image 36 and supplies the low-resolution images to the combining unit 155-3.

The combining unit 155-3 combines the high-resolution image of the +z surface 15 and the low-resolution image of the −z surface 16 supplied from the resolution decreasing unit 154-3, generates a composite image (a first composite image) of the +z surface 15, and supplies the composite image to the encoder 156-5. The combining unit 155-3 combines the high-resolution image of the −z surface 16 and the low-resolution image of the +z surface 15 supplied from the resolution decreasing unit 154-3, generates a composite image (a second composite image) of the −z surface 16, and supplies the composite image to the encoder 156-6.

The encoder 156-1 encodes the composite image of the +x surface 11 supplied from the combining unit 155-1 in accordance with an encoding scheme such as AVC or HEVC, and generates an encoded stream. Similarly, the encoders 156-2 to 156-6 generate encoded streams of the composite images of the surfaces 12 to 16.

The encoder 156-1 and the encoder 156-2 perform encoding so that the randomly accessible positions of the encoded streams of the composite images of the +x surface 11 and the −x surface 12 are synchronized with each other, and the GOP structure is a closed GOP structure. Similarly, the encoder 156-3 and the encoder 156-4 perform encoding so that the randomly accessible positions of the encoded streams of the composite images of the +y surface 13 and the −y surface 14 are synchronized with each other, and the GOP structure is a closed GOP structure. Further, the encoder 156-5 and the encoder 156-6 perform encoding so that the randomly accessible positions of the encoded streams of the composite images of the +z surface 15 and the −z surface 16 are synchronized with each other, and the GOP structure is a dosed GOP structure.

The encoders 156-1 to 156-6 supply the encoded streams of the composite images of the surfaces 11 to 16 to be recorded in the storage 157.

The storage 157 (a storage unit) records the six encoded streams of the composite images of the surfaces 11 to 16 supplied from the encoders 156-1 to 156-6.

The transmitting unit 158 (a delivering unit) reads out the six encoded streams recorded in the storage 157 and transmits (delivers) the six encoded streams to the home server 133 of FIG. 7 via a network (not illustrated).

(Description of Composite Image)

Figure 9:
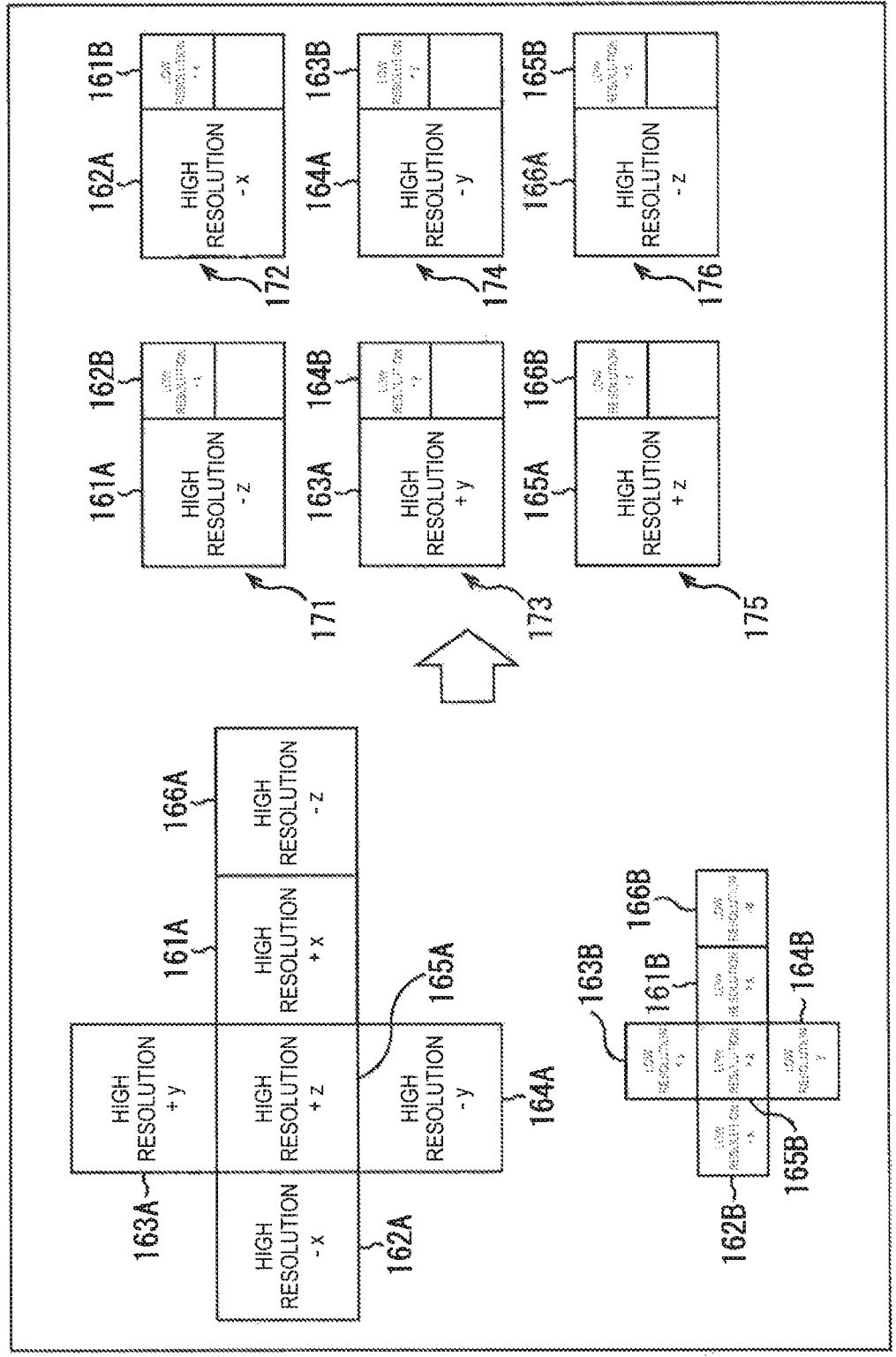
FIG. 9 is a diagram for describing a composite image generated by a combining unit of FIG. 8.

FIG. 9 is a diagram for describing the composite images of the surfaces 11 to 16 generated by the combining units 155-1 to 155-3 of FIG. 8.

As illustrated on the left side in FIG. 9, the resolution decreasing units 154-1 to 154-3 generate high-resolution images 161A to 166A of the surfaces 11 to 16 and low-resolution images 161B to 166B of the surfaces 11 to 16.

As illustrated on the right side in FIG. 9, the combining unit 155 combines the high-resolution image 161A and the low-resolution image 162B to generate a composite image 171 of the +x surface 11, and combines the high-resolution image 162A and the low-resolution image 161B to generate a composite image 172 of the −x surface 12.

Further, the combining unit 155-2 combines the high-resolution image 163A and the low-resolution image 164B to generate a composite image 173 of the +y surface 13, and combines the high-resolution image 164A and the low-resolution image 163B to generate a composite image 174 of the −y surface 14.

Further, the combining unit 155-3 combines the high-resolution image 165A and the low-resolution image 166B to generate a composite image 175 of the +z surface 15, and combines the high-resolution image 166A and the low-resolution image 165B to generate a composite image 176 of the −z surface 16.

(Exemplary Configuration of Encoder)

Figure 10:
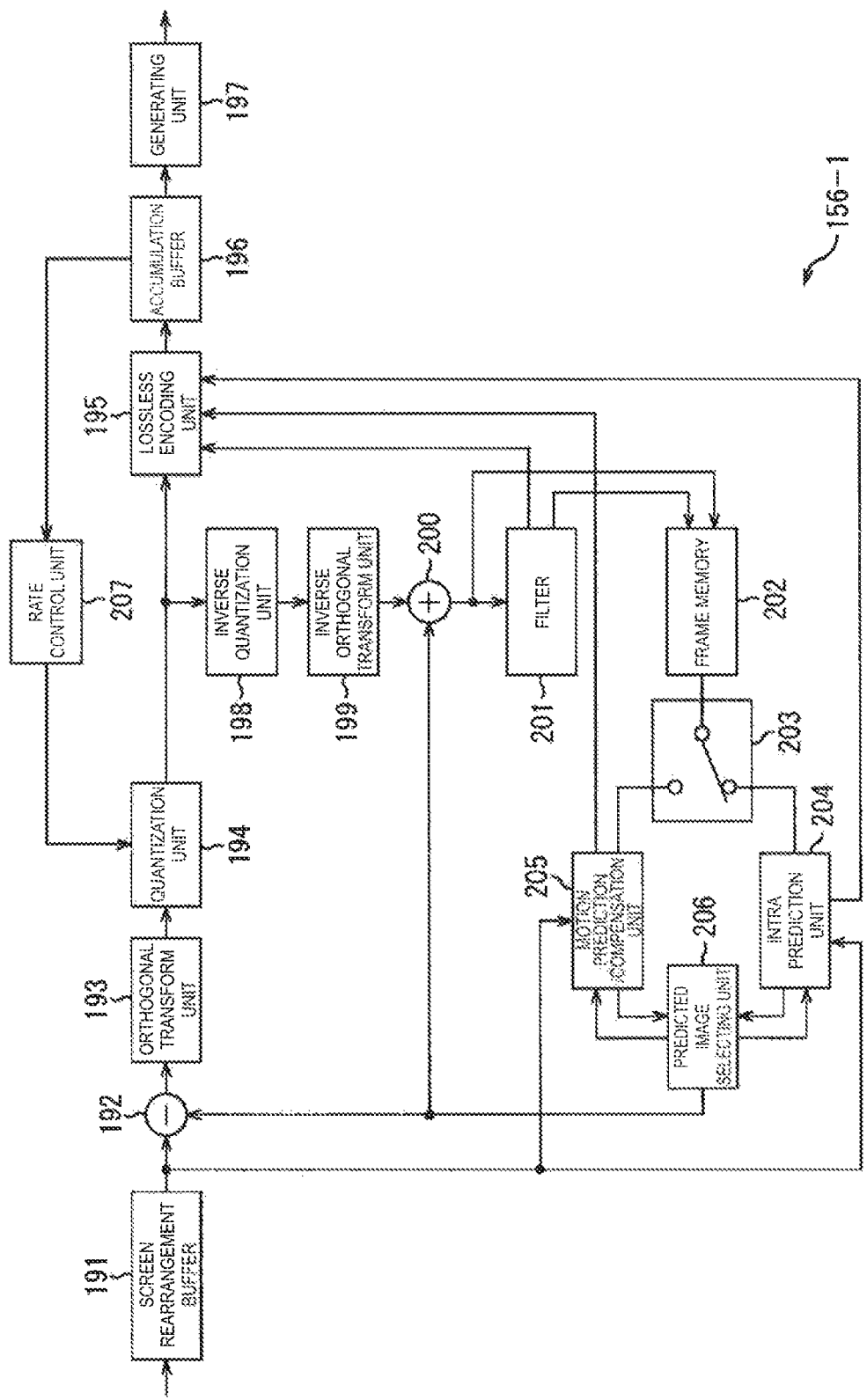
FIG. 10 is a block diagram illustrating an exemplary configuration of encoder of FIG. 8.

FIG. 10 is a block diagram illustrating an exemplary configuration of the encoder 156-1 of FIG. 8.

The encoder 156-1 of FIG. 10 includes a screen rearrangement buffer 191, an operation unit 192, an orthogonal transform unit 193, a quantization unit 194, a lossless encoding unit 195, an accumulation buffer 196, a generating unit 197, an inverse quantization unit 198, an inverse orthogonal transform unit 199, and an adding unit 200. The encoder 156-1 includes a filter 201, a frame memory 202, a switch 203, an intra prediction unit 204, a motion prediction/compensation unit 205, a predicted image selecting unit 206, and a rate control unit 207. The encoder 156-1 encodes the composite image of the +x surface 11 in units of coding units (CUs) in accordance with the HEVC scheme.

Specifically, the screen rearrangement buffer 191 of the encoder 156-1 stores the composite image of the +x surface 11 supplied from the combining unit 155-1 of FIG. 8. The screen rearrangement buffer 191 rearranges the composite images of the frame units stored in a display order in an encoding order in accordance with the GOP structure. The screen rearrangement buffer 191 outputs the rearranged composite images to the operation unit 192, the intra prediction unit 204, and the motion prediction/compensation unit 205.

The operation unit 192 performs encoding by subtracting a predicted image supplied from the predicted image selecting unit 206 from the composite image supplied from the screen rearrangement buffer 191. The operation unit 192 outputs a resulting image to the orthogonal transform unit 193 as residual information. Further, when the predicted image is not supplied from the predicted image selecting unit 206, the operation unit 192 outputs the composite image read from the screen rearrangement buffer 191 to the orthogonal transform unit 193 as the residual information without change.

The orthogonal transform unit 193 performs orthogonal transform on the residual information supplied from the operation unit 192 in units of transform units (TUs). The orthogonal transform unit 193 supplies orthogonal transform coefficients obtained as a result of orthogonal transform to the quantization unit 194.

The quantization unit 194 quantizes the orthogonal transform coefficients supplied from the orthogonal transform unit 193. The quantization unit 194 supplies the quantized orthogonal transform coefficients to the lossless encoding unit 195.

The lossless encoding unit 195 acquires intra prediction mode information indicating an optimal intra prediction mode from the intra prediction unit 204. Further, the lossless encoding unit 195 acquires inter prediction mode information indicating an optimal inter prediction mode, a motion vector, information specifying a reference image, and the like from the motion prediction/compensation unit 205. Further, the lossless encoding unit 195 acquires offset filter information related to an offset filter from the filter 201.

The lossless encoding unit 195 performs lossless encoding such as variable length coding (for example, context-adaptive variable length coding (CAVLC) or the like), arithmetic coding (for example, context-adaptive binary arithmetic coding (CABAC) or the like) on the quantized orthogonal transform coefficients supplied from the quantization unit 194.

Further, the lossless encoding unit 195 performs lossless encoding on the intra prediction mode information, the inter prediction mode information, the motion vector, the information specifying the reference image, and the offset filter information as encoding information related to encoding. The lossless encoding unit 195 supplies the encoding information and the orthogonal transform coefficients which have been subject to the lossless encoding to be accumulated in the accumulation buffer 196 as encoded data. Further, the encoding information which has been subject to the lossless encoding may be added to the encoded data as a header portion such as a slice header or the like.

The accumulation buffer 196 temporarily stores the encoded data supplied from the lossless encoding unit 195. Further, the accumulation buffer 196 supplies the stored encoded data to the generating unit 197.

The generating unit 197 generates an encoded stream from a parameter set such as a sequence parameter set (SPS) or a picture parameter set (PPS) and the encoded data supplied from the accumulation buffer 196 and supplies the generated encoded stream to the storage 157 of FIG. 8.

The quantized orthogonal transform coefficients output from the quantization unit 194 are also input to the inverse quantization unit 198. The inverse quantization unit 198 performs inverse quantization on the orthogonal transform coefficients quantized by the quantization unit 194 in accordance with a method corresponding to a quantization method in the quantization unit 194. The inverse quantization unit 198 supplies the orthogonal transform coefficients obtained as a result of inverse quantization to the inverse orthogonal transform unit 199.

The inverse orthogonal transform unit 199 performs inverse orthogonal transform on the orthogonal transform coefficients supplied from the inverse quantization unit 198 in units of TUs in accordance with a method corresponding to an orthogonal transform method in the orthogonal transform unit 193. The inverse orthogonal transform unit 199 supplies the resulting residual information to the adding unit 200.

The adding unit 200 locally decodes the composite image by adding the residual information supplied from the inverse orthogonal transform unit 199 and the predicted image supplied from the predicted image selecting unit 206. Further, when the predicted image is not supplied from the predicted image selecting unit 206, the adding unit 200 regards the residual information supplied from the inverse orthogonal transform unit 199 as the locally decoded composite image. The adding unit 200 supplies the decoded composite image to the frame memory 202 when the entire screen of the composite image is not decoded yet, and supplies the decoded composite image to the filter 201 when the entire screen is decoded.

The filter 201 performs a deblocking filter process of removing block distortion on the composite image supplied from the adding unit 200. The filter 201 performs an adaptive offset filter (a sample adaptive offset (SAO)) process of mainly removing ringing on the composite image which has been subject to the deblocking filter process.

Specifically, the filter 201 decides a type of adaptive offset filter process for each largest coding unit (LCU) which is a maximum coding unit, and obtains an offset used in the adaptive offset filter process. The filter 201 performs the adaptive offset filter process of the decided type on the composite image which has been subject to the deblocking filter process using the obtained offset.

The filter 201 supplies the composite image which has been subject to the adaptive offset filter process to the frame memory 202. Further, the filter 201 supplies information indicating the type of performed adaptive offset filter process and the offset to the lossless encoding unit 195 as the offset filter information.

The frame memory 202 accumulates the composite image supplied from the filter 201 and the composite image supplied from the adding unit 200. Adjacent pixels in prediction units (PUs) in the composite image which is accumulated in the frame memory 202 and has not been subject to the filter process are supplied to the intra prediction unit 204 via the switch 203 as peripheral pixels. On the other hand, the composite image which is accumulated in the frame memory 202 and has been subject to the filter process is output to the motion prediction/compensation unit 205 as the reference image via the switch 203.

The intra prediction unit 204 performs the intra prediction processes of all candidate intra prediction modes using the peripheral pixels read from the frame memory 202 via switch 203 in units of PUs.

Further, the intra prediction unit 204 calculates a cost function value (which will be described later) for all the candidate intra prediction modes on the basis of the composite image read from the screen rearrangement buffer 191 and the predicted image generated as a result of the intra prediction process. Then, the intra prediction unit 204 decides the intra prediction mode having the smallest cost function value as the optimal intra prediction mode.

The intra prediction unit 204 supplies the predicted image generated in the optimal intra prediction mode and the corresponding cost function value to the predicted image selecting unit 206. The intra prediction unit 204 supplies the intra prediction mode information to the lossless encoding unit 195 when a notification indicating selection of the predicted image generated in the optimal intra prediction mode is given from the predicted image selecting unit 206.

The cost function value is also referred to as a rate distortion (RD) cost and calculated on the basis of, for example, a technique such as a high complexity mode or a low complexity mode defined in a joint model (JM) which is reference software in the H.264/AVC scheme. The reference software in the AVC scheme is published at http://iphome.hhi.de/suehring/tml/index.htm.

The motion prediction/compensation unit 205 performs the motion prediction/compensation process of all the candidate inter prediction modes in units of PUs. Specifically, the motion prediction/compensation unit 205 detects the motion vectors of all the candidate inter prediction modes on the basis of the composite image and the reference image supplied from the screen rearrangement buffer 191. The motion prediction/compensation unit 205 performs the compensation process on the reference image on the basis of the motion vector to generate the predicted image. The inter prediction mode is a mode indicating the size of the PU or the like.

Further, the motion prediction/compensation unit 205 calculates the cost function value for all the candidate inter prediction modes on the basis of the composite image and the predicted image, and decides the inter prediction mode having the smallest cost function value as the optimal inter prediction mode. The motion prediction/compensation unit 205 supplies the cost function value of the optimal inter prediction mode and the corresponding predicted image to the predicted image selecting unit 206.

When a notification indicating selection of the predicted image generated in the optimal inter prediction mode is given from the predicted image selecting unit 206, the motion prediction/compensation unit 205 outputs the inter prediction mode information, the corresponding motion vector, the information specifying the reference image to the lossless encoding unit 195.

The predicted image selecting unit 206 decides one of the optimal intra prediction mode and the optimal inter prediction mode which is smaller in the corresponding cost function value as the optimal prediction mode on the basis of the cost function values supplied from the intra prediction unit 204 and the motion prediction/compensation unit 205. Then, the predicted image selecting unit 206 supplies the predicted image of the optimal prediction mode to the operation unit 192 and the adding unit 200. Further, the predicted image selecting unit 206 gives a notification indicating the selection of the predicted image of the optimal prediction mode to the intra prediction unit 204 or the motion prediction/compensation unit 205.

The rate control unit 207 controls the rate of the quantization operation of the quantization unit 194 on the basis of the encoded data accumulated in the accumulation buffer 196 so that neither overflow nor underflow occurs.

Although not illustrated, the encoders 156-2 to 156-6 have a similar configuration as that of the encoder 156-1.

(Description of Process of Content Server)

Figure 11:
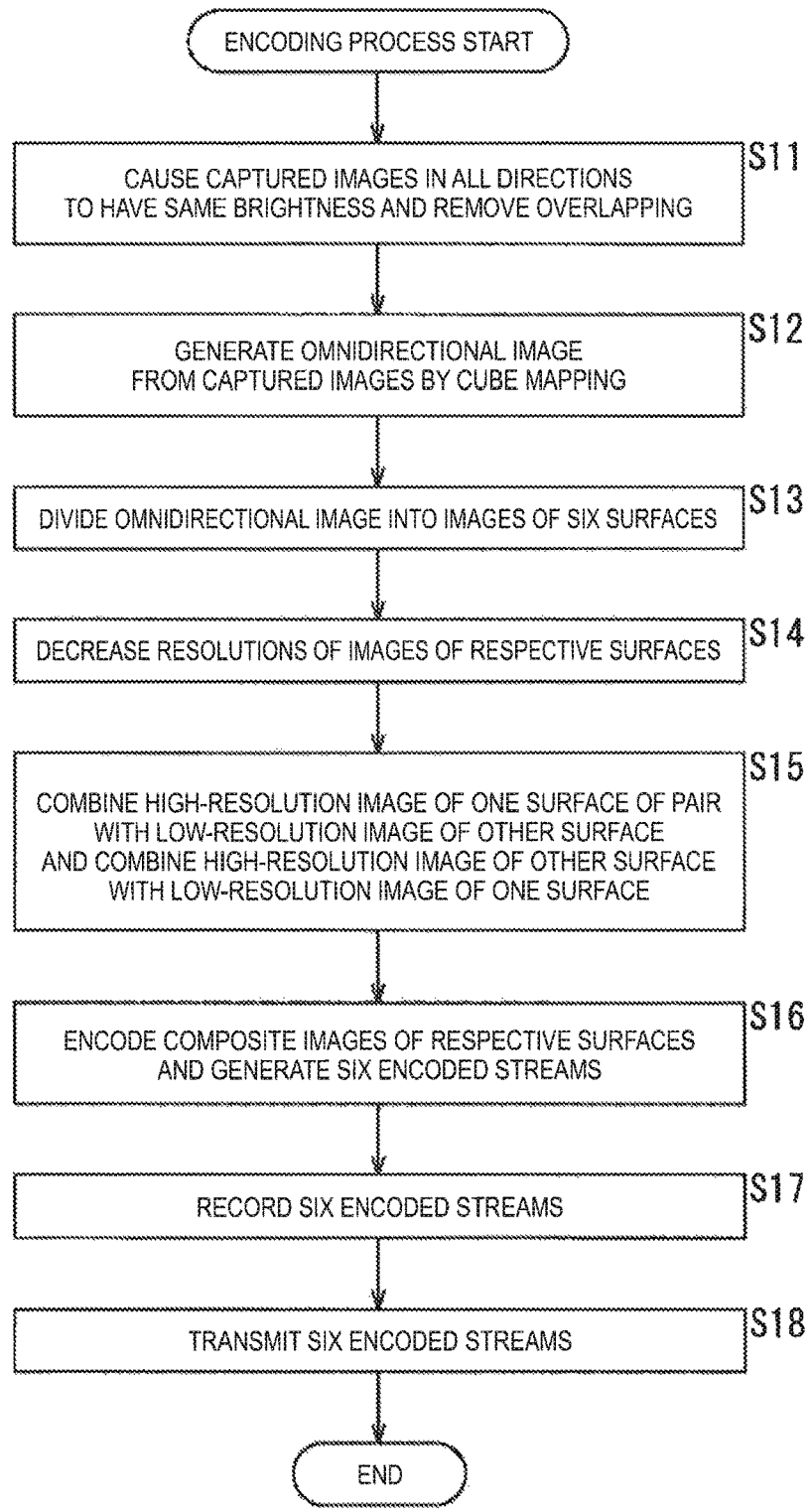
FIG. 11 is a flowchart illustrating an encoding process of the content server of FIG. 8.

FIG. 11 is a flowchart for describing an encoding process of the content server 132 of FIG. 8. The encoding process is performed, for example, in units of frames.

In step S11 of FIG. 11, the stitching processing unit 151 causes the captured images in all directions supplied from the multi-camera unit 131 of FIG. 7 to have the same color and brightness, removes overlapping thereof, and connects them. The stitching processing unit 151 supplies the resulting captured images to the mapping processing unit 152.

In step S12, the mapping processing unit 152 generates the omnidirectional image 30 from the captured images supplied from the stitching processing unit 151 by the cube mapping and supplies the omnidirectional image 30 to the dividing unit 153.

In step S13, the dividing unit 153 divides the omnidirectional image 30 supplied from the mapping processing unit 152 into the images 31 to 36 of the six surfaces 11 to 16. The dividing unit 153 supplies the images 31 and 32 to the resolution decreasing unit 154-1, supplies the images 33 and 34 to the resolution decreasing unit 154-2, and supplies the images 35 and 36 to the resolution decreasing unit 154-3.

The resolution decreasing unit 154-1 supplies the images 31 and 32 supplied from the dividing unit 153 to the combining unit 155-1 as the high-resolution image 161A and the high-resolution image 162A without change. Further, the resolution decreasing unit 154-2 supplies the images 33 and 34 to the combining unit 155-2 as the high-resolution image 163A and the high-resolution image 164A without change. Further, the resolution decreasing unit 154-3 supplies the images 35 and 36 to the combining unit 155-3 as the high-resolution image 165A and the high-resolution image 166A without change.

In step S14, the resolution decreasing unit 154-1 generates the low-resolution image 161B and the low-resolution image 162B by decreasing the resolutions of the image 31 and the image 32, and supplies the low-resolution image 161B and the low-resolution image 162B to the combining unit 155-1. Further, the resolution decreasing unit 154-2 generates the low-resolution image 163B and the low-resolution image 164B by decreasing the resolutions of the image 33 and the image 34, and supplies the low-resolution image 163B and the low-resolution image 164B to the combining unit 155-2. Further, the resolution decreasing unit 154-3 generate the low-resolution image 165B and the low-resolution image 166B by decreasing the resolutions of the image 35 and the image 36, and supplies the low-resolution image 165B and the low-resolution image 166B to the combining unit 155-3.

In step S15, the combining unit 155-1 combines the high-resolution image 161A of the +x surface 11 which is one surface of the pair of the +x surface 11 and the −x surface 12 with the low-resolution image 162B of the −x surface 12 which is the other surface, generates the composite image of the +x surface 11, and supplies the composite image to the encoder 156-1. Further, the combining unit 155-1 combines the high-resolution image 162A of the −x surface 12 which is the other surface with the low-resolution image 161B of the +x surface 11 which is one surface, generates the composite image of the −x surface 12, and supplies the composite image to the encoder 156-2.

Similarly, the combining unit 155-2 generates the composite image of the +y surface 13 and supplies the composite image to the encoder 156-3, and generates the composite image of the −y surface 14 and supplies the composite image to the encoder 156-4. Further, the combining unit 155-3 generates the composite image of the +z surface 15 and supplies the composite image to the encoder 156-5, and generates the composite image of the −z surface 16 and supplies the composite image to the encoder 156-6.

In step S16, the encoders 156-1 to 156-6 encode the composite images of the surfaces 11 to 16, generates the six encoded streams, and supply them to the storage 157.

In step S17, the storage 157 records the six encoded streams supplied from the encoders 156-1 to 156-6.

In step S18, the transmitting unit 158 reads the six encoded streams recorded in the storage 157 and transmits them to the home server 133 via a network (not illustrated). Then, the process ends.

(Exemplary Configuration of Home Server)

Figure 12:
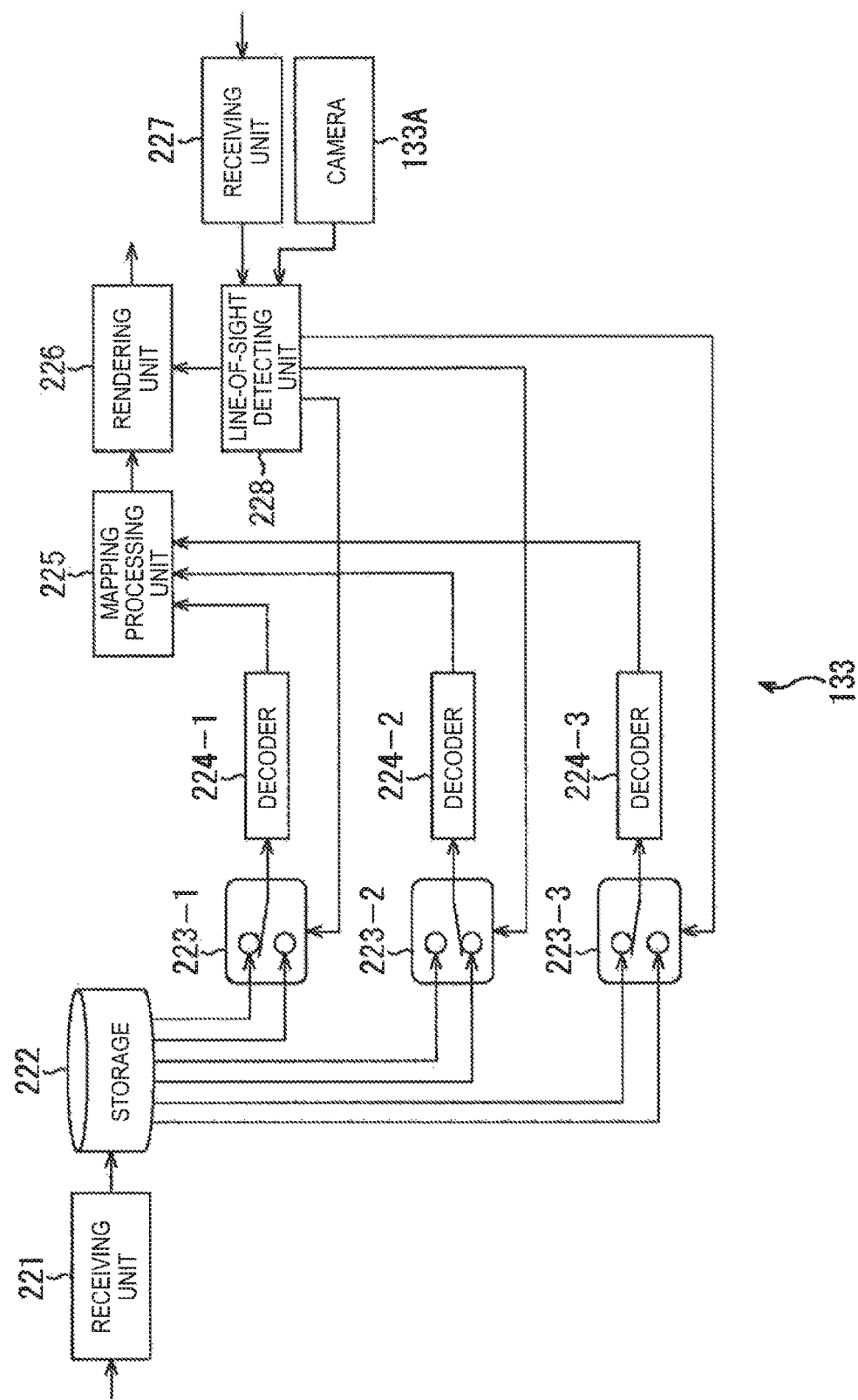
FIG. 12 is a block diagram illustrating an exemplary configuration of a home server of FIG. 7.

FIG. 12 is a block diagram illustrating an exemplary configuration of the home server 133 of FIG.

The home server 133 of FIG. 12 includes a camera 133A, a receiving unit 221, a storage 222, switches 223-1 to 223-3, decoders 224-1 to 224-3, a mapping processing unit 225, a rendering unit 226, a receiving unit 227, and a line-of-sight detecting unit 228.

The receiving unit 221 of the home server 133 receives the six encoded streams transmitted from the transmitting unit 158 of FIG. 8 via a network (not illustrated). The receiving unit 221 supplies the received six encoded streams to be recorded in the storage 222.

The storage 222 records the six encoded streams supplied from the receiving unit 221. The storage 222 reads two encoded streams of the composite images of the pair of the +x surface 11 and the −x surface 12 which are opposed to each other among the six encoded streams, and supplies the two encoded streams to the switch 223-1. Similarly, the storage 222 supplies two encoded streams of the composite images of the pair of the +y surface 13 and the −y surface 14 which are opposite to each other to the switch 223-2, and supplies two encoded streams of the composite images of the pair of the ±z surface 15 and the −z surface 16 which are opposite to each other to the switch 223-3.

On the basis of the surface selection information of selecting one of the +x surface 11 and the −x surface 12 supplied from the line-of-sight detecting unit 228, the switch 223-1 selects the encoded stream of the composite image of one surface, and supplies the selected encoded stream to the decoder 224-1. Similarly, the switch 223-2 supplies the encoded stream of the composite image of one surface of the +y surface 13 and the −y surface 14 to the decoder 224-2 on the basis of the surface selection information. Further, the switch 223-3 supplies the encoded stream of the composite image of one surface of the +z surface 15 and the −z surface 16 to the decoder 224-3 on the basis of the surface selection information.

The decoder 224-1 decodes the encoded stream supplied from the switch 223-1, generates the composite image of the +x surface 11 or the −x surface 12, and supplies the generated composite image to the mapping processing unit 225. Further, the decoder 224-2 decodes the encoded stream supplied from the switch 223-2, generates the composite image of the +y surface 13 or the −y surface 14, and supplies the composite image to the mapping processing unit 225. Further, the decoder 224-3 decodes the encoded stream supplied from the switch 223-3, generates a composite image of the +z surface 15 or the −z surface 16, and supplies the composite image to the mapping processing unit 225.

The mapping processing unit 225 (a separating unit) separates the composite images of the three surfaces supplied from the decoders 224-1 to 224-3, generates the high-resolution images of the three surfaces and the low-resolution images of the three surfaces opposite to the three surfaces. Then, the mapping processing unit 225 maps the high-resolution images of the three surfaces and the low-resolution images of the three surfaces to the surfaces 11 to 16 of the cube 10 as the textures and supplies a resulting cube image to the rendering unit 226.

The rendering unit 226 generates the image of the field-of-view range of the user by projecting the cube image supplied from the mapping processing unit 225 in the field-of-view range of the user supplied from the line-of-sight detecting unit 228. The rendering unit 226 transmits the generated image to the converting device 134 of FIG. 7 as the display image via the HDMI cable.

The receiving unit 227 receives the detection result of the gyro sensor 135B of FIG. 7 from the head mounted display 135 via the converting device 134 and supplies the detection result to the line-of-sight detecting unit 228.

The line-of-sight detecting unit 228 decides the line-of-sight vector of the user on the basis of the detection result of the gyro sensor 135B supplied from the receiving unit 227. The line-of-sight detecting unit 228 decides three surfaces corresponding to the line-of-sight vector of the user among the surfaces 11 to 16 on the basis of the line-of-sight vector of the user.

Specifically, the line-of-sight detecting unit 228 decides the +x surface 11 or the −x surface 12 in which positive and negative of the x component and the x axis coordinate of the line-of-sight vector are the same, the +y surface 13 or the −y surface 14 in which positive and negative of the y component and the y axis coordinate are the same, and the +z surface 15 or the −z surface 16 in which positive and negative of the z component and the z axis coordinate are the same as the three surfaces corresponding to the line-of-sight vector of the user.

Further, the line-of-sight detecting unit 228 acquires the captured image of the marker 135A from the camera 133A, and detects the position of the user on the basis of the captured image. The line-of-sight detecting unit 228 decides the field-of-view range of the user on the basis of the position of the user and the line-of-sight vector.

The line-of-sight detecting unit 228 supplies the field-of-view range of the user to the rendering unit 226. The line-of-sight detecting unit 228 generates the surface selection information of selecting the surfaces corresponding to the line-of-sight vector of the user for each pair of opposite surfaces among the surfaces 11 to 16. The line-of-sight detecting unit 228 supplies the surface selection information of selecting the +x surface 11 or the −x surface 12 to the switch 223-1, supplies the surface selection information of selecting the +y surface 13 or the −y surface 14 to the switch 223-2, and supplies the surface selection information of selecting the +z surface 15 or the −z surface 16 to the switch 223-3.

(Exemplary Configuration of Decoder)

Figure 13:
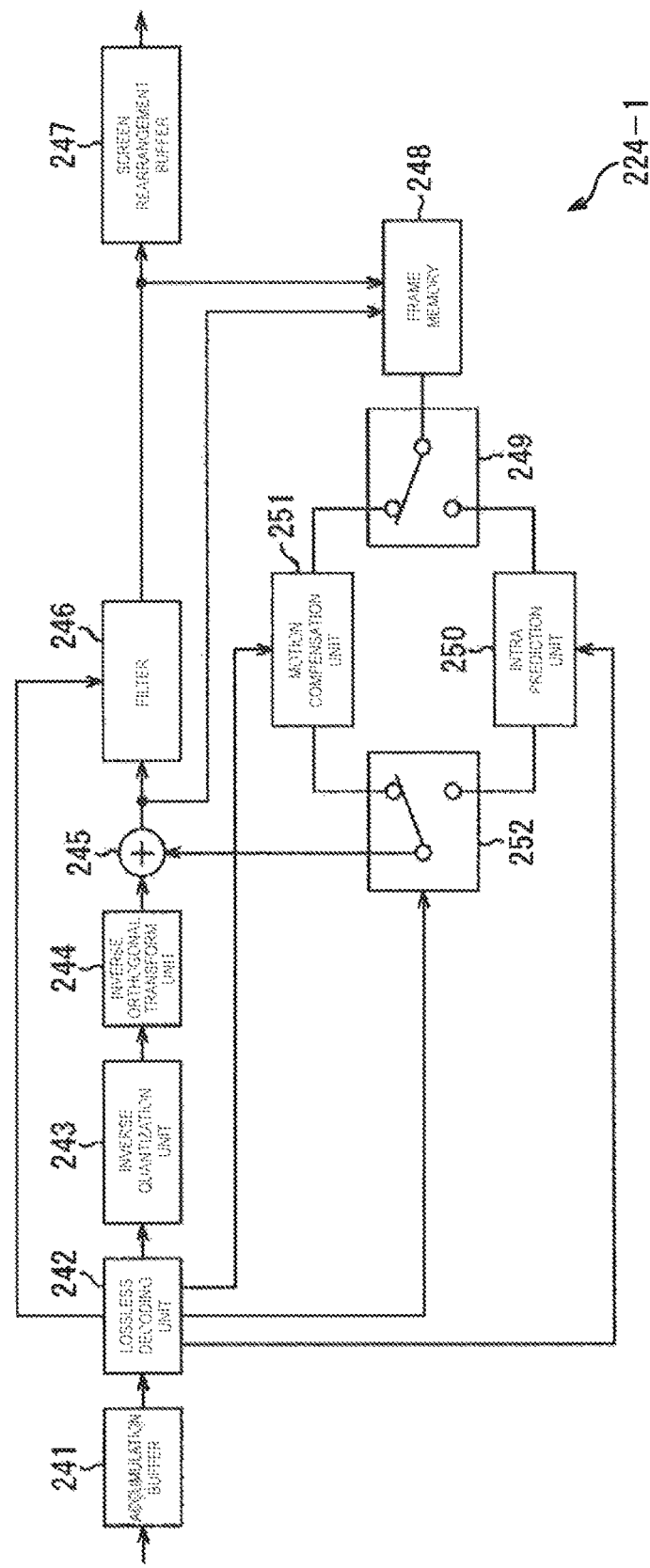
FIG. 13 is a block diagram illustrating an exemplary configuration of a decoder of FIG. 12.

FIG. 13 is a block diagram illustrating an exemplary configuration of the decoder 224-1 of FIG. 12.

The decoder 224-1 of FIG. 13 includes an accumulation buffer 241, a lossless decoding unit 242, an inverse quantization unit 243, an inverse orthogonal transform unit 244, an adding unit 245, a filter 246, and a screen rearrangement buffer 247. The decoder 224-1 further includes a frame memory 248, a switch 249, an intra prediction unit 250, a motion compensation unit 251, and a switch 252.

The accumulation buffer 241 of the decoder 224-1 receives the encoded stream from the switch 223-1 of FIG. 12 and accumulates the encoded data. The parameter set included in the encoded stream is supplied to the respective units of the decoder 224-1 as necessary. The accumulation buffer 241 supplies the accumulated encoded data to the lossless decoding unit 242.

The lossless decoding unit 242 obtains the quantized orthogonal transform coefficients and the quantized encoding information by performing lossless decoding such as variable length decoding or arithmetic decoding corresponding to the lossless encoding of the lossless encoding unit 195 of FIG. 10 on the encoded data supplied from the accumulation buffer 241. The lossless decoding unit 242 supplies the quantized orthogonal transform coefficients to the inverse quantization unit 243. The lossless decoding unit 242 also supplies the intra prediction mode information serving as the encoding information to the intra prediction unit 250. The lossless decoding unit 242 supplies the motion vector, the inter prediction mode information, the information specifying the reference image, and the like to the motion compensation unit 251.

Furthermore, the lossless decoding unit 242 supplies the infra prediction mode information or the inter prediction mode information serving as the encoding information to the switch 252.

The inverse quantization unit 243, the inverse orthogonal transform unit 244, the adding unit 245, the filter 246, the frame memory 248, the switch 249, the intra prediction unit 250, and the motion compensation unit 251 perform similar processes to those of to the inverse quantization unit 198, the inverse orthogonal transform unit 199, the adding unit 200, the filter 201, the frame memory 202, the switch 203, the intra prediction unit 204, and the motion prediction/compensation unit 205 of FIG. 10, and thus the composite image is decoded.

Specifically, the inverse quantization unit 243 performs inverse quantization on the quantized orthogonal transform coefficients supplied from the lossless decoding unit 242 and supplies resulting orthogonal transform coefficients to the inverse orthogonal transform unit 244.

The inverse orthogonal transform unit 244 performs inverse orthogonal transform on the orthogonal transform coefficients supplied from the inverse quantization unit 243 in units of TUs. The inverse orthogonal transform unit 244 supplies the residual information obtained as a result of inverse orthogonal transform to the adding unit 245.

The adding unit 245 locally decodes the composite image by adding the residual information supplied from the inverse orthogonal transform unit 244 and the predicted image supplied from the switch 252. Further, when the predicted image is not supplied from the switch 252, the adding unit 245 regards the residual information supplied from the inverse orthogonal transform unit 244 as the locally decoded composite image. The adding unit 245 supplies the decoded composite image to the frame memory 248 when the entire screen of the composite image is not decoded yet, and supplies the decoded composite image to the filter 246 when the entire screen is decoded.

The filter 246 performs the deblocking filter process on the composite image supplied from the adding unit 245. For each LCU, the filter 246 performs an adaptive offset filter process of a type indicated by the offset filter information on the composite image which has been subject to the deblocking filter process using the offset indicated by the offset filter information supplied from lossless decoding unit 242. The filter 246 supplies the composite image which has been subject to the adaptive offset filter process to the frame memory 248 and the screen rearrangement buffer 247.

The screen rearrangement buffer 247 stores the composite image supplied from the filter 246 in units of frames, The screen rearrangement buffer 247 rearranges the composite images of the frame units stored in the encoding order in an original display order, and supplies the rearranged composite images to the mapping processing unit 225 of FIG. 12.

The frame memory 248 accumulates the composite image supplied from the filter 246 and the composite image supplied from the adding unit 245. Adjacent pixels in PUs in the composite image which is accumulated in the frame memory 248 and has not been subject to the filter process are supplied to the intra prediction unit 250 via the switch 249 as peripheral pixels. On the other hand, the composite image which is accumulated in the frame memory 248 and has been subject to the filter process is output to the motion compensation unit 251 as the reference image via the switch 249.

The intra prediction unit 250 performs the intra prediction process of the optimal intra prediction mode indicated by the intra prediction mode information supplied from the lossless decoding unit 242 in units of PUs using the peripheral pixels read from the frame memory 248 via the switch 249, The intra prediction unit 250 supplies the resulting predicted image to the switch 252.

The motion compensation unit 251 reads the reference image specified by the information specifying the reference image supplied from the lossless decoding unit 242 from the frame memory 248 via the switch 249. The motion compensation unit 251 performs the motion compensation process of the optimal inter prediction mode indicated by the inter prediction mode information supplied from the lossless decoding unit 242 in units of PU using the reference image and the motion vector supplied from the lossless decoding unit 242. The motion compensation unit 251 supplies the resulting predicted image to the switch 252.

When the intra prediction mode information is supplied from the lossless decoding unit 242, the switch 252 supplies the predicted image supplied from the intra prediction unit 250 to the adding unit 245. On the other hand, when the inter prediction mode information is supplied from the lossless decoding unit 242, the switch 252 supplies the predicted image supplied from the motion compensation unit 251 to the adding unit 245.

(Example of Cube Image)

Figure 14:
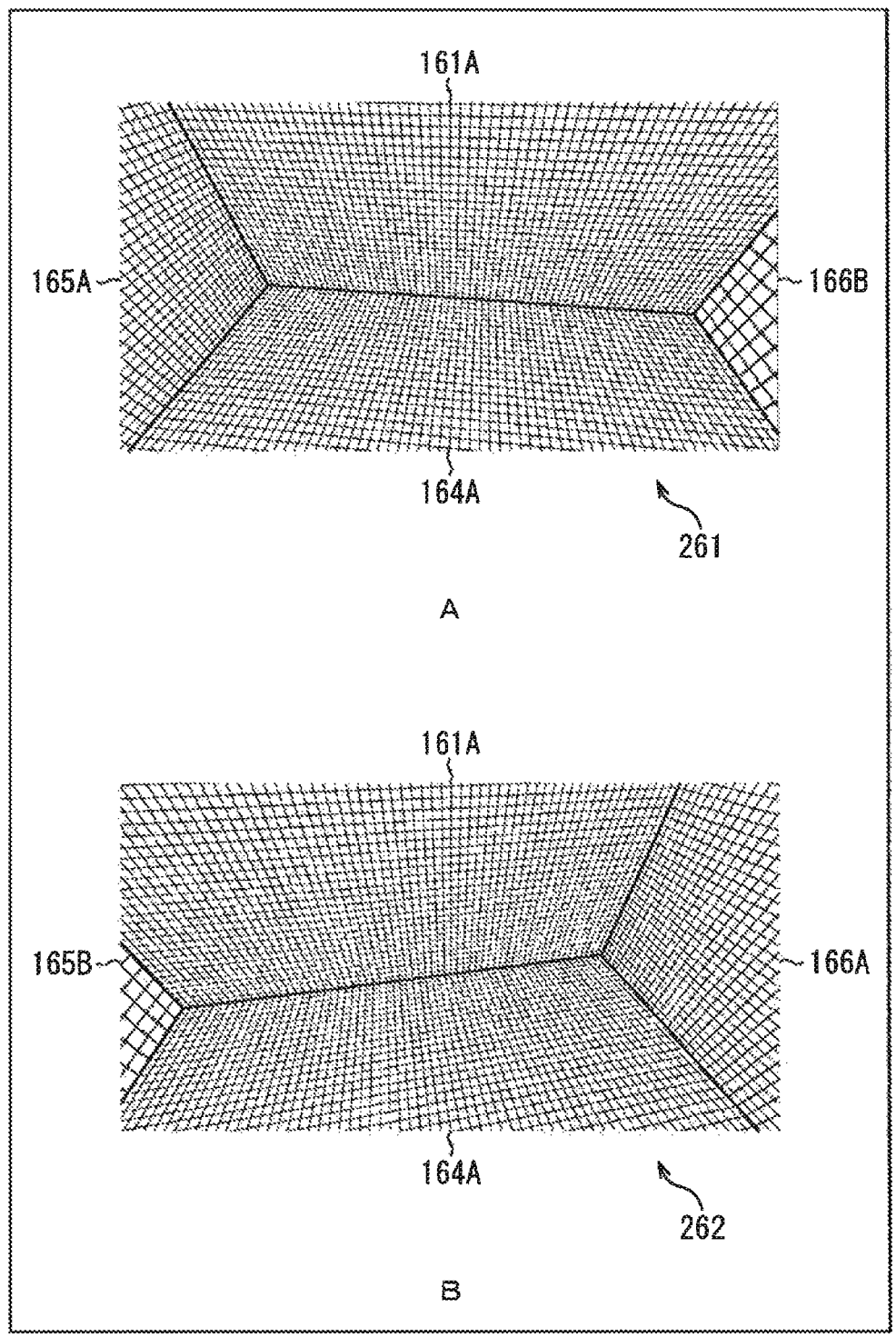
FIG. 14 is a diagram for describing a cube image generated by a mapping processing unit of FIG. 12.

FIG. 14 is a diagram for describing a cube image generated by the mapping processing unit 225 of FIG. 12.

In FIG. 14, squares indicate the LCUs of the cube image. FIGS. 14A and 14B are diagram illustrating the cube image viewed from the inside of the cube 10.

In the example of FIG. 14A, the surfaces corresponding to the line-of-sight vector of the user are the +x surface 11, the −y surface 14, and the +z surface 15. Thus, as illustrated in FIG. 14A, the mapping processing unit 225 maps the high-resolution image 161A, the high-resolution image 164A, and the high-resolution image 165A to the +x surface 11, the −y surface 14, and the +z surface 15 of the cube 10, respectively. Further, the mapping processing unit 225 maps the low-resolution image 162B, the low-resolution image 163B, and the low-resolution image 166B to the −x surface 12, the +y surface 13, and the −z surface 16 of the cube 10, respectively. Accordingly, a cube image 261 is generated.

The high-resolution images 161A, 164A, and 165A and the low-resolution images 162B, 163B, and 166B are mapped to the surfaces having the same size. Thus, the size of the LCU of the low-resolution images 16213, 163B, and 16613 is larger than the size of the LCU of the high-resolution images 161A, 164A, and 165A.

In the example of FIG. 14B, the surfaces corresponding to the line-of-sight vector of the user are the +x surface 11, the −y surface 14, and the −z surface 16. Therefore, as illustrated in FIG. 14B, the mapping processing unit 225 maps the high-resolution image 161A, the high-resolution image 164A, the high-resolution image 166A to the +x surface 11, the −y surface and the −z surface 16 of the cube 10, respectively. Further, the mapping processing unit 225 maps the low-resolution image 162B, the low-resolution image 163B, and the low-resolution image 165B to the −x surface 12, the +y surface 13, and the +z surface 15 of the cube 10, respectively. Accordingly, a cube image 262 is generated.

The high-resolution images 161A, 164A, and 166A and the low-resolution images 162B, 163B, and 165B are mapped to the surfaces having the same size. Thus, the size of the LCU of the low-resolution images 162B, 163B, and 165B is larger than the size of the LCU of the high-resolution images 161A, 164A, and 166A.

As described above, the high-resolution image is mapped to one surface of the pair of opposite surfaces of the cube 10, and the low-resolution image is mapped to the other surface.

Further, when the line-of-sight vector of the user is changed, and the surfaces corresponding to the line-of-sight vector of the user are changed, at least one surface to which the high-resolution image is mapped is changed from one surface of the pair of opposite surfaces to the other surface. For example, when the surfaces corresponding to the line-of-sight vector of the user are changed from the +x surface 11, the −y surface 14, and the +z surface 15 to the +x surface 11, the −y surface 14, and the −z surface 16, the cube image 261 is changed to the cube image 262.

At this time, since the cube images 261 and 262 are images mapped to all of the surfaces 11 to 16, the rendering unit 226 can immediately generate the display image of the field-of-view range of the user using the cube image 262 until the cube image 262 corresponding to the changed line-of-sight vector is generated.

(Example of Operation Timing of Decoder)

Figure 15:
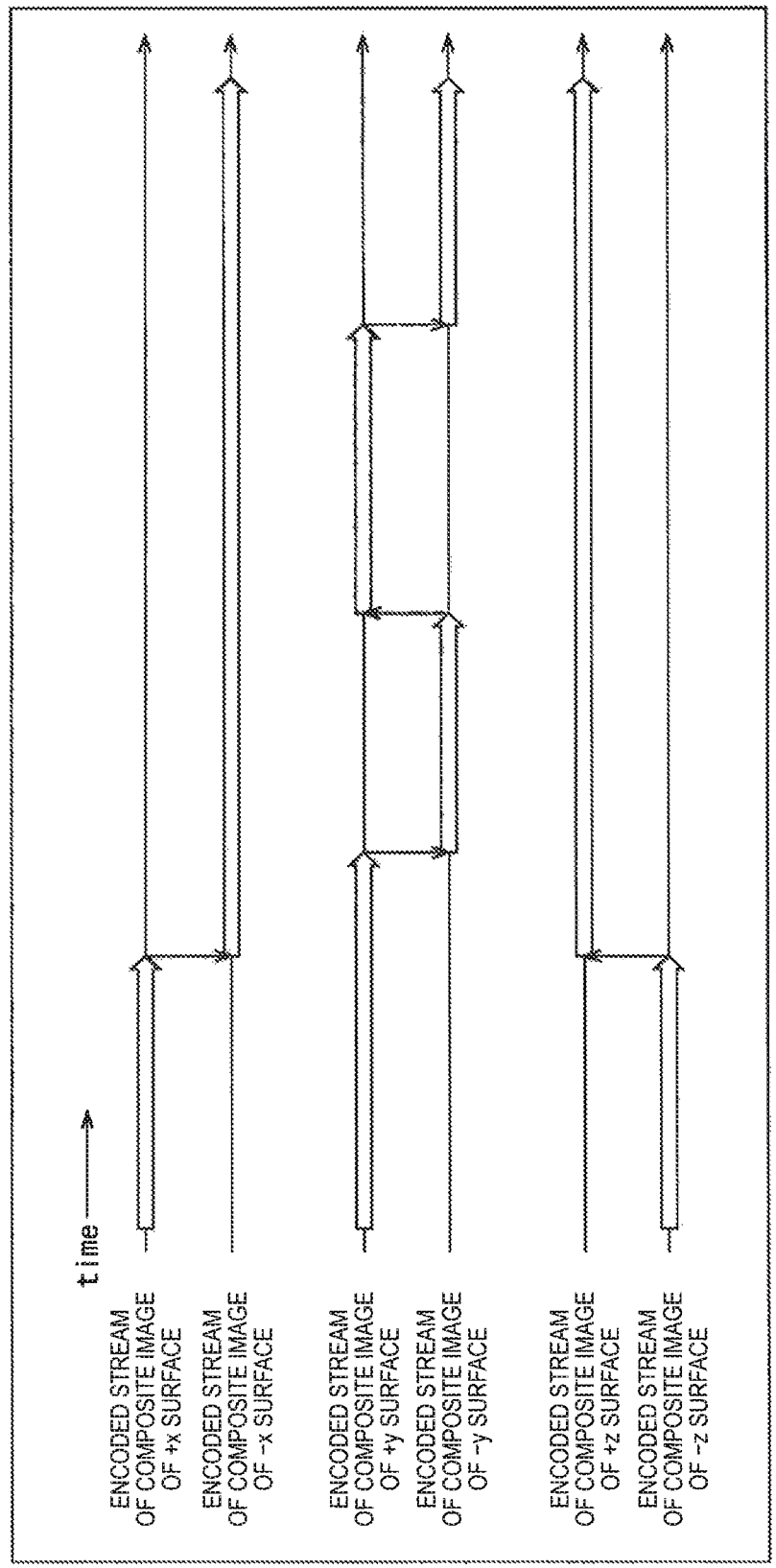
FIG. 15 is a timing chart illustrating an example of an operation timing of a decoder of FIG. 12.

FIG. 15 is a timing chart illustrating an example of operation timings of the decoders 224-1 to 224-3 of FIG. 12.

In FIG. 15, a horizontal axis indicates a time. The same applies to FIG. 16 to be described later. Further, in FIG. 15, thick arrows indicate decoding targets of the decoders 224-1 to 224-3.

When the surface selection information supplied from the line-of-sight detecting unit 228 is changed, the switches 223-1 to 223-3 change the encoded stream to be selected at the random accessible positions of the input two encoded streams. Therefore, as illustrated in FIG. 15, in the decoders 224-1 to 224-3, the encoded stream of the decoding target is freely switched at the random accessible position.

In other words, in the image display system 130, the high-resolution image of one surface of the pair of opposite surfaces among the surfaces 11 to 16 and the low-resolution image of the other surface are combined and encoded. Therefore, in the decoders 224-1 to 224-3, it is unnecessary to synchronize a switching timing of the decoding target in order to generate the high-resolution image of one surface corresponding to the user line-of-sight vector in the pair and the low-resolution image of the other surface.

Figure 16:
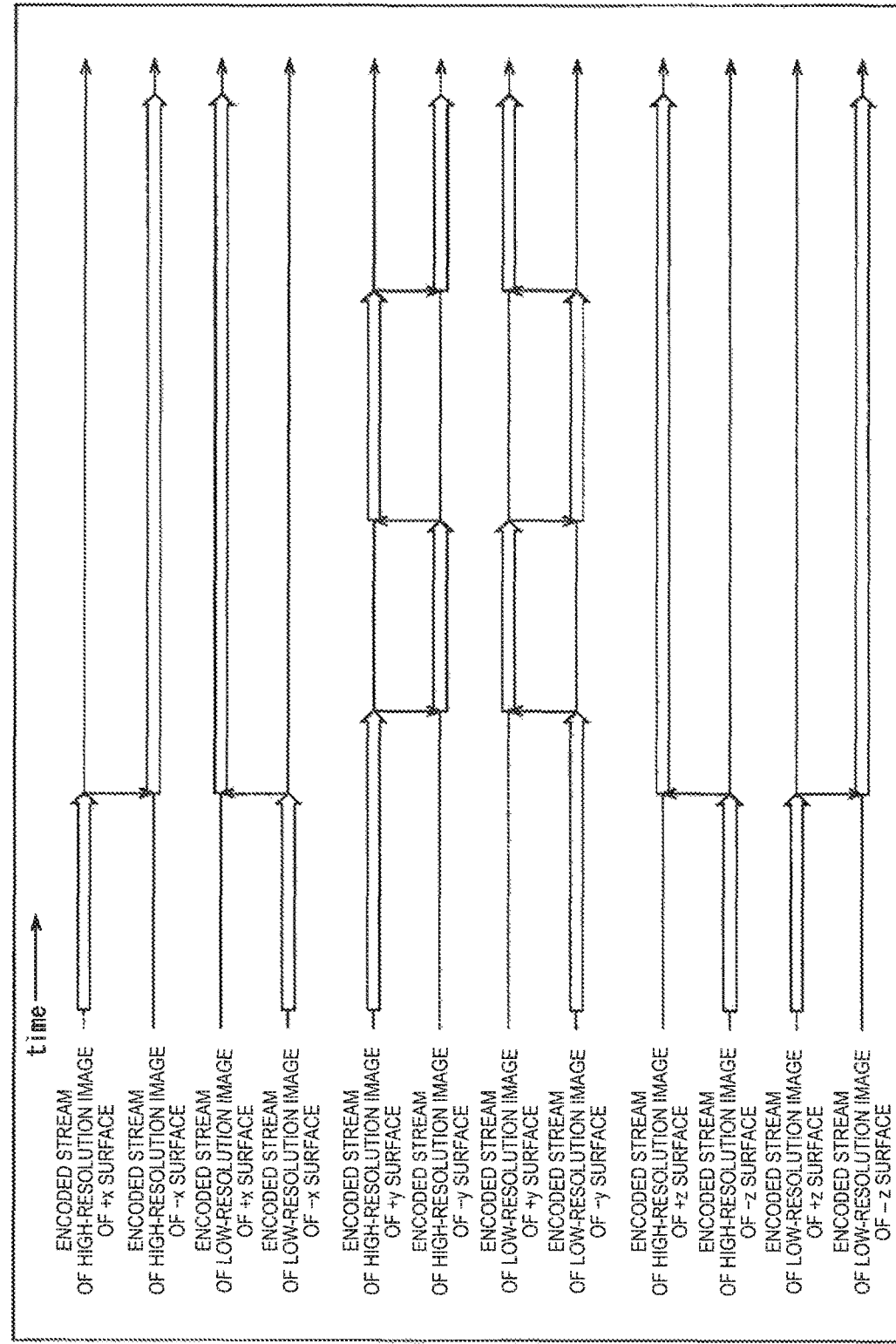
FIG. 16 is a timing chart illustrating an example of an operation timing of a decoder when a high-resolution image and a low-resolution image are separately encoded.

On the other hand, as illustrated in FIG. 16, when the high-resolution images 161A to 166A and the low-resolution images 161B to 166B are separately encoded, it is necessary to install a high resolution decoder and a low resolution decoder for each pair of opposite surfaces among the surfaces 11 to 16. In other words, six decoders are necessary. In FIG. 16, thick arrows indicate decoding targets of the six decoders.

Further, for each pair, it is necessary to synchronize the switching timing of the decoding target between the high resolution decoder and the low resolution decoder. For example, it is necessary to perform switching of the decoding target of the high resolution decoder of the pair of the +x surface 11 and the −x surface 12 and switching of the decoding target of the low resolution decoder of the pair of the +x surface 11 and the −x surface 12.

Therefore, it is difficult to control the switching. Further, it is necessary to synchronize the random accessible positions of a total of 4 encoded streams of the high-resolution images and the low-resolution image of each pair and to set the closed GOP structure as the GOP structure.

Further, the random accessible positions of the two encoded streams input to the switches 223-1 to 223-3 are synchronized, and the GOP structure is the closed GOP structure. Therefore, it is desirable that the decoders 224-1 to 224-3 decode the decoding target after the switching from the position at the time of switching.

On the other hand, when the random accessible positions of the two encoded streams are different or when the GOP structure is not the closed GOP structure, it is necessary to decode the decoding target after switching from the position before the time of the switching. Therefore, during that time, it is necessary to simultaneously decode the two encoded streams of the decoding target before the switching and the decoding target after the switching, and decoders which correspond in number to the encoded streams are necessary.

Further, when the encoders 156-1 to 156-6 perform encoding so that the random accessible positions of each pair are different, the switching timing of the decoding target can be shifted between the decoders 224-1 to 224-3. Accordingly, the load of the decoding process can be smoothed.

(Description of Processing of Home Server)

Figure 17:
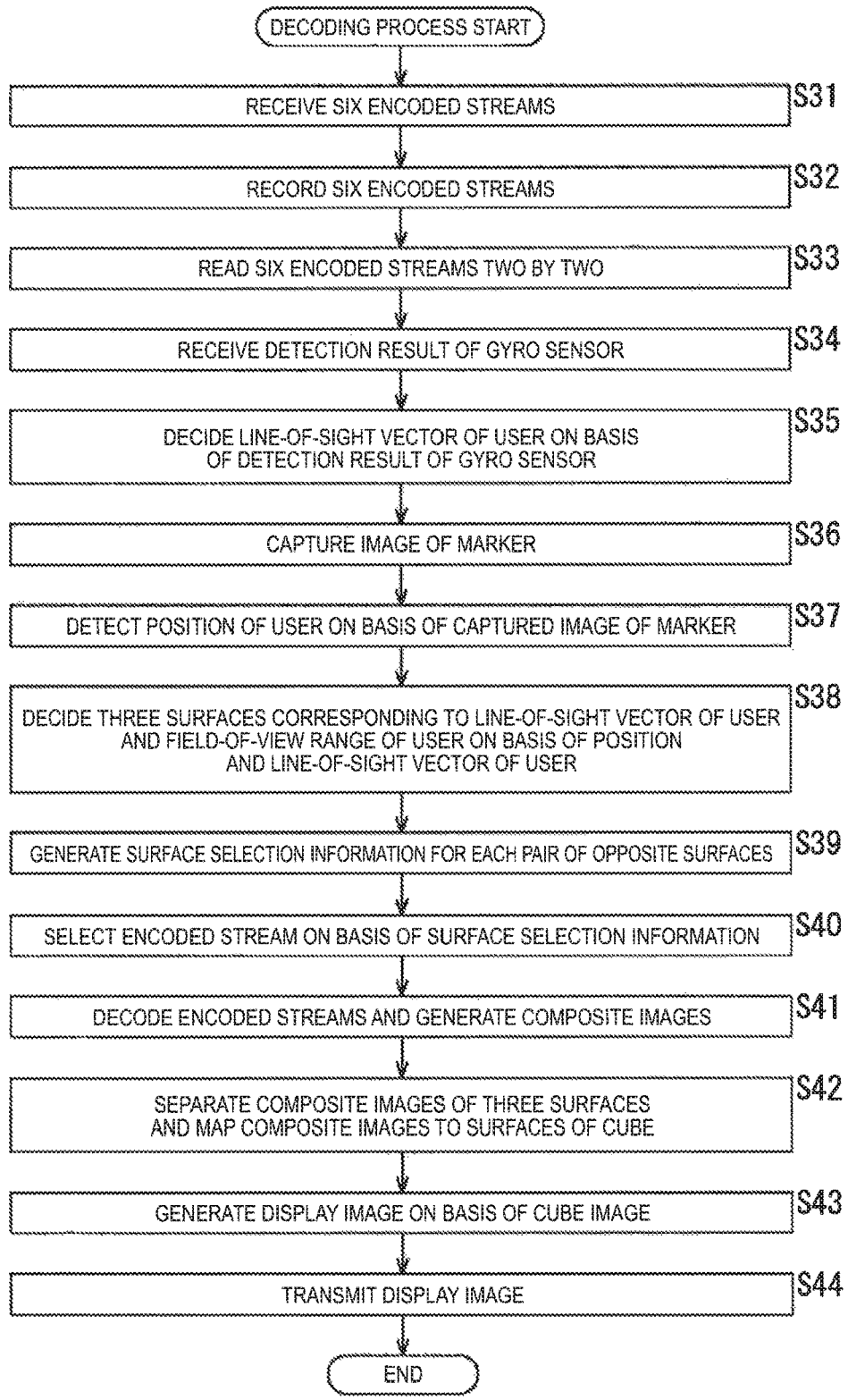
FIG. 17 is a flowchart for describing a decoding process of the home server of FIG. 12.

FIG. 17 is a flowchart for describing the decoding process of the home server 133 of FIG. 12. The decoding process is performed, for example, in units of frames.

In step S31 of FIG. 17, the receiving unit 221 of the home server 133 receives the six encoded streams transmitted from the transmitting unit 158 of FIG. 8 via a network (not illustrated). The receiving unit 221 supplies the received six encoded streams to the storage 222.

In step S32, the storage 222 records the six encoded streams supplied from the receiving unit 221.

In step S33, the storage 222 reads the two encoded streams of the pair of the +x surface 11 and the −x surface 12 which are opposite to each other among the six encoded streams, and supplies the two encoded streams to the switch 223-1. Similarly, the storage 222 supplies the two encoded streams of the pair of the +y surface 13 and the −y surface 14 which are opposite to each other to the switch 223-2, and supplies the two encoded streams of the pair of the +z surface 15 and the −z surface 16 which are opposite to each other to the switch 223-3.

In step S34, the receiving unit 227 receives the detection result of the gyro sensor 135B of FIG. 7 from the head mounted display 135 via the converting device 134 and supplies the detection result to the line-of-sight detecting unit 228.

In step S35, the line-of-sight detecting unit 228 decides the line-of-sight vector of the user on the basis of the detection result of the gyro sensor 135B supplied from the receiving unit 227.

In step S36, the camera 133A captures the image of the marker 135A and supplies the image to the line-of-sight detecting unit 228. In step S37, the line-of-sight detecting unit 228 detects the position of the user on the basis of the captured image of the marker 135A supplied from the camera 133A.

In step S38, the line-of-sight detecting unit 228 decides the three surfaces corresponding to the line-of-sight vector of the user among the surfaces 11 to 16 and the field-of-view range of the user on the basis of the position of the user and the line-of-sight vector. The line-of-sight detecting unit 228 supplies the field-of-view range of the user to the rendering unit 226.

In step S39, the line-of-sight detecting unit 228 generates the surface selection information of selecting the surfaces corresponding to the line-of-sight vector of the user for each pair of opposite surfaces among the surfaces 11 to 16. The line-of-sight detecting unit 228 supplies the surface selection information of selecting the +x surface 11 or the −x surface 12 to the switch 223-1, supplies the surface selection information of selecting the +y surface 13 or the −y surface 14 to the switch 223-2, and supplies the surface selection information of selecting the +z surface 15 or the −z surface 16 to the switch 223-3.

In step S40, on the basis of the surface selection information of selecting one of the +x surface 11 and the −x surface 12 supplied from the line-of-sight detecting unit 228, the switch 223-1 selects the encoded stream of the composite image of one surface, and supplies the selected encoded stream to the decoder 224-1. Similarly, the switch 223-2 supplies the encoded stream of the composite image of one surface of the +y surface 13 and the −y surface 14 to the decoder 224-2 on the basis of the surface selection information. Further, the switch 223-3 supplies the encoded stream of the composite image of one surface of the +z surface 15 and the −z surface 16 to the decoder 224-3 on the basis of the surface selection information.

In step S41, the decoder 224-1 decodes the encoded stream supplied from the switch 223-1, generates the composite image of the +x surface 11 or the −x surface 12, and supplies the generated composite image to the mapping processing unit 225. Further, the decoder 224-2 decodes the encoded stream supplied from the switch 223-2, generates the composite image of the +y surface 13 or the −y surface 14, and supplies the composite image to the mapping processing unit 225. Further, the decoder 224-3 decodes the encoded stream supplied from the switch 223-3, generates a composite image of the +z surface 15 or the −z surface 16, and supplies the composite image to the mapping processing unit 225.

In step S42, the mapping processing unit 225 separates the composite images of the three surfaces supplied from the decoders 224-1 to 224-3, and maps the high-resolution image of the three surfaces and the low-resolution image of the three surfaces obtained as a result to the surfaces 11 to 16 of the cube 10. The mapping processing unit 225 supplies the resulting cube image to the rendering unit 226.

In step S43, the rendering unit 226 generates the image of the field-of-view range of the user as the display image by projecting the cube image in the field-of-view range of the user on the basis of the cube image supplied from the mapping processing unit 225 and the field-of-view range of the user supplied from the line-of-sight detecting unit 228.

In step S44, the rendering unit 226 transmits the display image to the converting device 134 of FIG. 7 via the HDMI cable, and then the process ends.

As described above, the content server 112 of the image display system 130 combines the high-resolution image of one surface and the low-resolution image of the other surface for each pair of opposite surfaces among the surfaces 11 to 16 to generate the composite image of one surface, and combines the low-resolution image of one surface and the high-resolution image of the other surface to generate the composite image of the other surface. Then, the content server 132 encodes the composite images of the respective surfaces and generate the six encoded streams.

Therefore, compared to when the high-resolution images and the low-resolution images of the surfaces 11 to 16 are separately encoded, and the encoded streams of the high-resolution images of the three surfaces corresponding to the line-of-sight vector and the low-resolution images of the remaining three surfaces are decoded, the number of encoded streams can be reduced from 12 to 6. Further, since the number of encoders is reduced from 12 to 6, the number of decoders can be reduced from 6 to 3. Furthermore, it is unnecessary to synchronize the switching timing of the decoding target among the decoders 224-1 to 224-3, and thus the control of the switching can be easily performed.

Further, the home server 133 decodes the encoded stream of the low-resolution image for the three surfaces other than the three surfaces corresponding to the line-of-sight vector. Therefore, compared with when the encoded streams of the high-resolutions images of all the surfaces are decoded, it is possible to reduce the number of pixels to be decoded and reduce the decoding process amount. Further, even when the line-of-sight vector is abruptly changed, it is possible to generate the image of the field-of-view range of the user on the basis of the low-resolution images of the surfaces until the high-resolution images of the surfaces corresponding to the changed line-of-sight vector are decoded. Therefore, it is possible to immediately display the image of the field-of-view range of the user after the change.

<Second Embodiment>
(Description of Composite Image in Second Embodiment of Image Display System)

In a second embodiment of the image display system to which the present disclosure is applied, the omnidirectional image is generated by the equidistant cylindrical projection other than the cube mapping. In this case, as described above with reference to FIG. 4, the number of surfaces is eight, and the number of pairs of opposite surfaces is four. A configuration of the second embodiment of the image display system is the same as the configuration of the image display system 130 except that each of the number of resolution decreasing units and the number of combining units of the content server is 4, the number of encoders is 8, and each of the number of switches and the number of decoders of the home server is 4, and thus description thereof is omitted.

Figure 18:
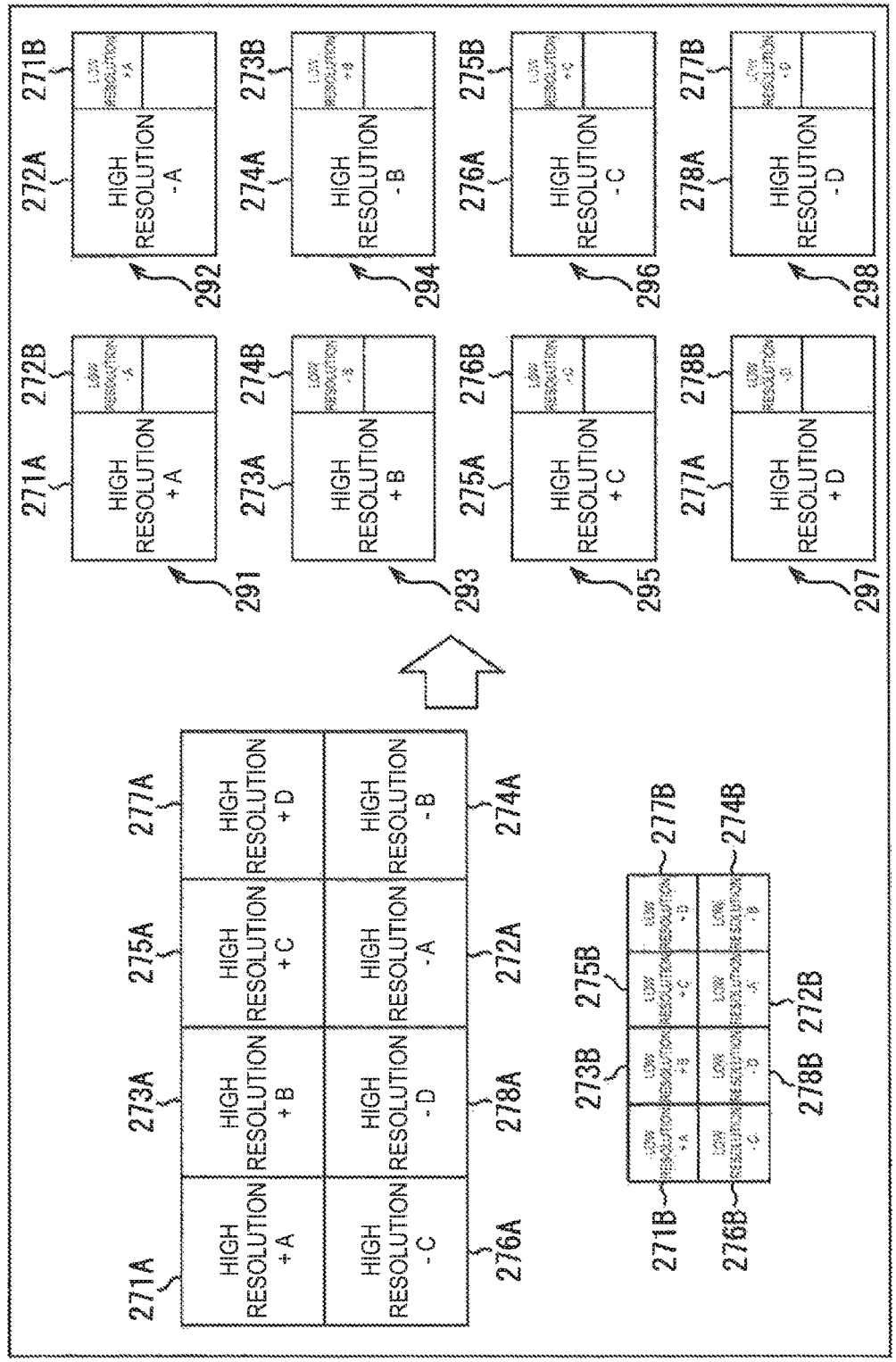
FIG. 18 is a diagram for describing a composite image of a second embodiment of the image display system to which the present disclosure is applied.

FIG. 18 is a diagram illustrating the composite image of the second embodiment of the image display system to which the present disclosure is applied.

As illustrated on the left side of FIG. 18, in the second embodiment, the omnidirectional image 90 is divided into the images 91 to 98 of the surfaces 71 to 78 which are high-resolution images 271A to 278A. Further, the resolutions of the images 91 to 98 are decreased to generate low-resolution images 271B to 278B of the surfaces 71 to 78.

Then, as illustrated on the right side of FIG. 18, the high-resolution image 271A of the +A surface 71 which is one surface of the pair of the +A surface 71 and the −A surface 72 which are opposite to each other and the low-resolution image 272B of the −A surface 72 which is the other surface are combined to generate a composite image 291 of the +A surface 71. Further, the high-resolution image 272A of the −A surface 72 and the low-resolution image 271B of the +A surface 71 are combined to generate a composite image 292 of the −A surface 72.

Further, the high-resolution image 273A of the +B surface 73 which is one surface of the pair of the +B surface 73 and the −B surface 74 which are opposite to each other and the low-resolution image 274B of the −B surface 74 which is the other surface are combined to generate a composite image 293 of the +B surface 73. Further, the high-resolution image 274A of the −B surface 74 and the low-resolution image 273B of the +B surface 73 are combined to generate a composite image 294 of the −B surface 74.

Further, the high-resolution image 275A of the +C surface 75 which is one surface of the pair of the +C surface 75 and the −C surface 76 which are opposite to each other and the low-resolution image 276B of the −C surface 76 which is the other surface are combined to generate a composite image 295 of the +C surface 75. Further, the high-resolution image 276A of the −C surface 76 and the low-resolution image 275B of the +C surface 75 are combined to generate a composite image 296 of the −C surface 76.

Further, the high-resolution image 277A of the +D surface 77 which is one surface of the pair of the +D surface 77 and the −D surface 78 which are opposite to each other and the low-resolution image 278B of the −D surface 78 which is the other surface are combined to generate a composite image 297 of the +D surface 77, Further, the high-resolution image 278A of the −D surface 78 and the low-resolution image 277B of the +D surface 77 are combined to generate a composite image 298 of the −D surface 78.

The composite images 291 to 298 generated as described above are encoded to generate the eight encoded streams. Among the eight encoded streams, only the four encoded streams of the composite images of the four surfaces corresponding to the line-of-sight vector of the user are decoded in the home server.

As illustrated in FIG. 18, the low-resolution image of one surface of the pair of opposite surfaces and the high-resolution image of the other surface are included in the composite images 291 to 298. Therefore, when the four encoded streams are decoded, the low-resolution images or the high-resolution images of all the surfaces 71 to 78 are generated.

Therefore, even when the line-of-sight vector is abruptly changed, it is possible to generate the image of the field-of-view range of the user after the change on the basis of the low-resolution images of the surfaces until the high-resolution images of the surfaces corresponding to the line-of-sight vector after the change are decoded. Therefore, it is possible to immediately display the image of the Field-of-view range of the user after the change.

<Third Embodiment>
(Exemplary Configuration of Content Server of Third Embodiment of Image Display System)

A third embodiment of the image display system to which the present disclosure is applied is similar to the image display system 130 of FIG. 7 except that the multi-camera unit acquires a captured image of YCbCr 420 and a parallax image (to be described later in detail), and configurations of the content server and the home server are different. Therefore, the following description will proceed focusing on the content server and home server. The parallax image is an image configured with a parallax value indicating a position of a subject of each pixel in a depth direction.

Figure 19:
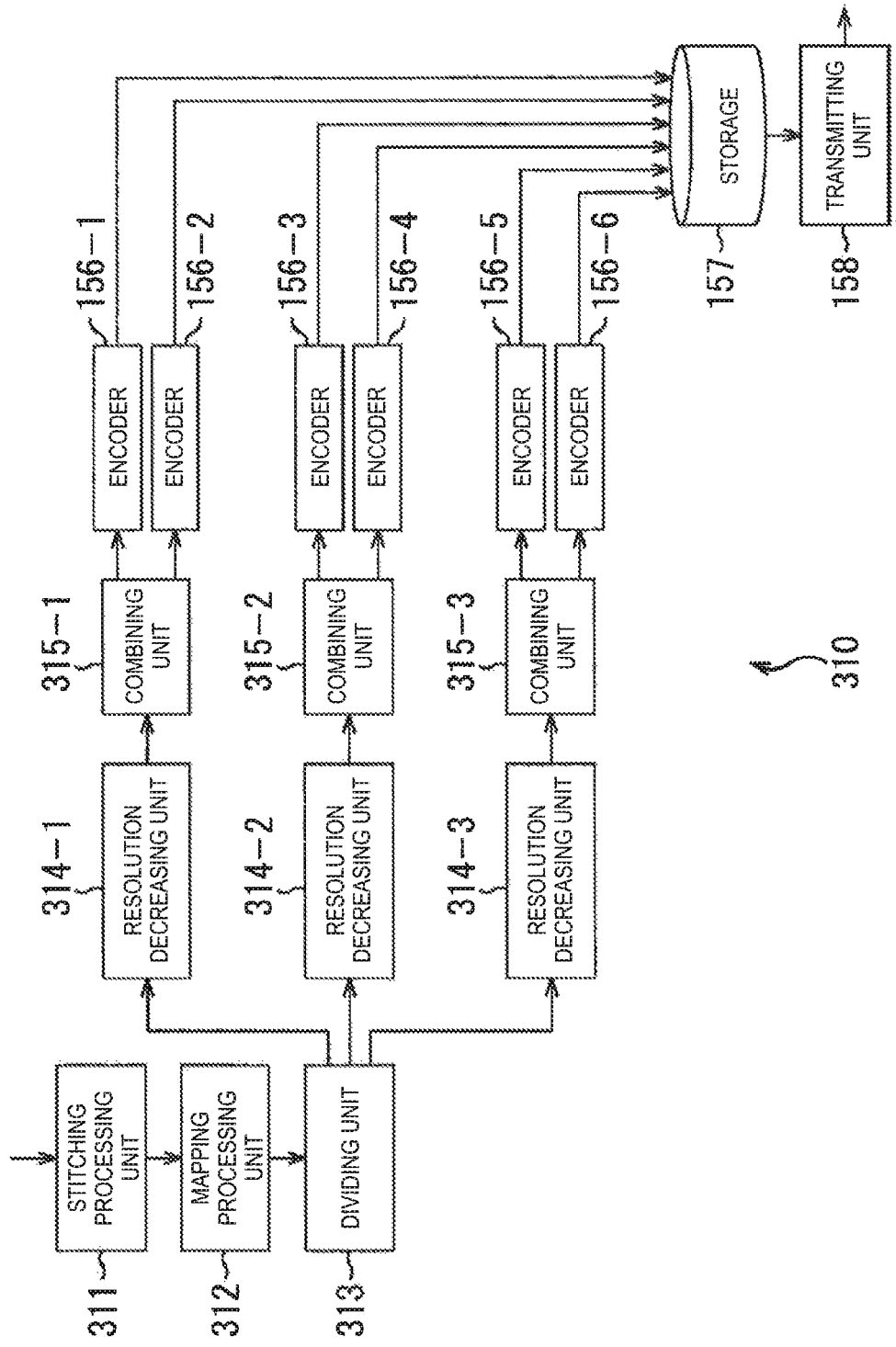
FIG. 19 is a block diagram illustrating an exemplary configuration of a content server of a third embodiment of the image display system to which the present disclosure is applied.

FIG. 19 is a block diagram illustrating an exemplary configuration of the content server of the third embodiment of the image display system to which the present disclosure is applied.

In a configuration illustrated in FIG. 19, the same parts as those of FIG. 8 are denoted by the same reference numerals. A repeated description will be appropriately omitted.

A configuration of a content server 310 of FIG. 19 differs from the configuration of the content server 132 of FIG. 8 in that a stitching processing unit 311, a mapping processing unit 312, a dividing unit 313, resolution decreasing units 314-1 to 314-3, and combining units 315-1 to 315-3 are arranged instead of the stitching processing unit 151, the mapping processing unit 152, the dividing unit 153, the resolution decreasing units 154-1 to 154-3, and the combining units 155-1 to 155-3. The content server 310 includes the parallax image in the composite image of the surfaces 11 to 16.

Specifically, the stitching processing unit 311 causes the captured images in all directions supplied from the multi-camera unit to have the same color and brightness, removes overlapping thereof, and connects them. Further, the stitching processing unit 311 removes overlapping of the parallax images of the captured images in all directions supplied from the multi-camera unit and connects them. The stitching processing unit 311 supplies the captured images and the parallax images which are obtained accordingly to the mapping processing unit 312.

The mapping processing unit 312 generates the omnidirectional image 30 of the captured image from the captured images supplied from the stitching processing unit 311 by the cube mapping and supplies the omnidirectional image 30 to the dividing unit 313. The mapping processing unit 312 generates the omnidirectional image of the parallax image from the parallax images supplied from the stitching processing unit 311 by the cube mapping and supplies the omnidirectional image to the dividing unit 313.

The dividing unit 313 divides the omnidirectional image 30 of the captured image supplied from the mapping processing unit 312 into images 31 to 36 of the six surfaces 11 to 16. Further, the dividing unit 313 divides the omnidirectional image of the parallax image supplied from the mapping processing unit 312 into six parallax images of surfaces 11 to 16.

The dividing unit 313 supplies the image 31 and the image 32 and the parallax images of the pair of the +x surface 11 and the −x surface 12 which are opposite to each other among the six surfaces 11 to 16 to the resolution decreasing unit 314-1. Further, the dividing unit 313 supplies the image 33 and the image 34 and the parallax images of the pair of the +y surface 13 and the −y surface 14 which are opposite to each other to the resolution decreasing unit 314-2, and supplies the image 35 and the image 36 and the parallax images of the pair of the +z surface 15 and the −z surface 16 which are opposite to each other to resolution decreasing unit 314-3.

The resolution decreasing unit 314-1 supplies the image 31 and the image 32 supplied from the dividing unit 313 to the combining unit 315-1 as a high-resolution image 161A and a high-resolution image 162A without change. Further, the resolution decreasing unit 314-1 performs the resolution reduction by reducing the resolutions of lama components and chroma components of the image 31 and the image 32 in the horizontal direction and the vertical direction to ½, and generates a low-resolution image 161B and a low-resolution image 162B.

Further, the resolution decreasing unit 314-1 performs the resolution reduction by reducing the resolutions of the parallax images of the +x surface 11 and the −x surface 12 supplied from the dividing unit 313 in the horizontal direction and the vertical direction to ½, and generates the parallax images of the high-resolution image 161A and the high-resolution image 162A. Further, the resolution decreasing unit 314-1 performs the resolution reduction by reducing the resolutions of the parallax images of the +x surface 11 and the −x surface 12 in the horizontal direction and the vertical direction to ¼, and generates the parallax images of the low-resolution image 161B and the low-resolution image 162B.

The resolution decreasing unit 314-1 supplies the parallax images of the high-resolution image 161A and the high-resolution image 162A and the parallax images of the low-resolution image 161B and the low-resolution image 162B to the combining unit 315-1.

The combining unit 315-1 combines the luma component of the high-resolution image 161A supplied from the resolution decreasing unit 314-1, the luma component of the low-resolution image 162B, and the parallax image of the high-resolution image 161A to generate a luma component of a composite image (a first composite image) of the +x surface 11. Further, the combining unit 315-1 combines the Cb component of the chroma components of the high-resolution image 162A, the Cb component of the low-resolution image 162B, and the parallax image of the low-resolution image 162B to generate a Cb component of the composite image of the +x surface 11. Further, the combining unit 315-1 combines the Cr component of the chroma components of the high-resolution image 161A and the Cr component of the low-resolution image 162B to generate a Cr component of a composite image of the +x surface 11. Then, the combining unit 315-1 supplies the luma components and the chroma components of the composite image of the +x surface 11 to the encoder 156-1.

The combining unit 315-1 combines the luma component of the high-resolution image 162A supplied from the resolution decreasing unit 314-1, the luma component of the low-resolution image 161B, and the parallax image of the high-resolution image 162A to generate a luma component of a composite image (a first composite image) of the −x surface 12. Further, the combining unit 315-1 combines the Cb component of the high-resolution image 162A, the Cb component of the low-resolution image 161B, and the parallax image of the low-resolution image 161B to generate a Cb component of the composite image of the −x surface 12. Further, the combining unit 315-1 combines the Cr component of the high-resolution image 162A and the Cr component of the low-resolution image 161B to generate a Cr component of a composite image of the −x surface 12. Then, the combining unit 315-1 supplies the luma components and the chroma components of the composite image of the −x surface 12 to the encoder 156-1.

Similarly to the resolution decreasing unit 314-1, the resolution decreasing unit 314-2 supplies the image 33 and the image 34 supplied from the dividing unit 313 to the combining unit 315-2 as the high-resolution image 163A and the high-resolution image 164A. Similarly to the resolution decreasing unit 314-1, the resolution decreasing unit 314-2 generates the low-resolution image 163B and the low-resolution image 164B from the image 33 and the image 34 and supplies the low-resolution image 163B and the low-resolution image 164B to the combining unit 315-2.

Further, similarly to the resolution decreasing unit 314-1, the resolution decreasing unit 314-2 generates the parallax images of the high-resolution image 163A and the high-resolution image 164A and the parallax images of the low-resolution image 163B and the low-resolution image 164B from the parallax images of the +y surface 13 and the −y surface 14 supplied from the dividing unit 313, and supplies the parallax images to the combining unit 315-2.

Similarly to the combining unit 315-1, the combining unit 315-2 generates the luma component sand the chroma components of the composite image (the first composite image) of the +y surface 13 from the high-resolution image 163A, the low-resolution image 164B, and the parallax images of the high-resolution image 163A and the low-resolution image 164B supplied from the resolution decreasing unit 314-2. Then, the combining unit 315-2 supplies the luma components and the chroma components of the composite image of the +y surface 13 to the encoder 156-3.

Similarly to the combining unit 315-1, the combining unit 315-2 generates the luma component sand the chroma components of the composite image (the second composite image) of the −y surface 14 from the high-resolution image 164A, the low-resolution image 163B, and the parallax images of the high-resolution image 164A and the low-resolution image 163B supplied from the resolution decreasing unit 314-2. Then, the combining unit 315-2 supplies the luma components and the chroma components of the composite image of the −y surface 14 to the encoder 156-4.

Similarly to the resolution decreasing unit 314-1, the resolution decreasing unit 314-3 supplies the image 35 and the image 36 supplied from the dividing unit 313 to the combining unit 315-3 as the high-resolution image 165A and the high-resolution image 166A. Similarly to the resolution decreasing unit 314-1, the resolution decreasing unit 314-3 generates the low-resolution image 165B and the low-resolution image 166B from the image 35 and the image 36 and supplies the low-resolution image 165B and the low-resolution image 166B to the combining unit 315-3.

Further, similarly to the resolution decreasing unit 314-1, the resolution decreasing unit 314-3 generates the parallax images of the high-resolution image 165A and the high-resolution image 166A of the +z surface 15 and the −z surface 16 supplied from the dividing unit 313 and the parallax images of the low-resolution image 165B and low-resolution image 166B, and supplies the parallax images to the combining unit 315-3.

Similarly to the combining unit 315-1, the combining unit 315-3 generates the luma components and the chroma components of the composite image (the first composite image) of the +z surface 15 from the high-resolution image 165A, the low-resolution image 166B, and the parallax images of the high-resolution image 165A and the low-resolution image 166B supplied from the combining unit 315-2. Then, the combining unit 315-3 supplies the luma components and the chroma components of the composite image of the +z surface 15 to the encoder 156-5.

Similarly to the combining unit 315-1, the combining unit 315-3 generates the luma components and the chroma components of the composite image (the second composite image) of the −z surface 16 from the high-resolution image 166A, the low-resolution image 165B, and the parallax images of the high-resolution image 166A and the low-resolution image 165B supplied from the combining unit 315-2. Then, the combining unit 315-3 supplies the luma components and the chroma components of the composite image of the −z surface 16 to the encoder 156-6.

(Description of Composite Image)

Figure 20:
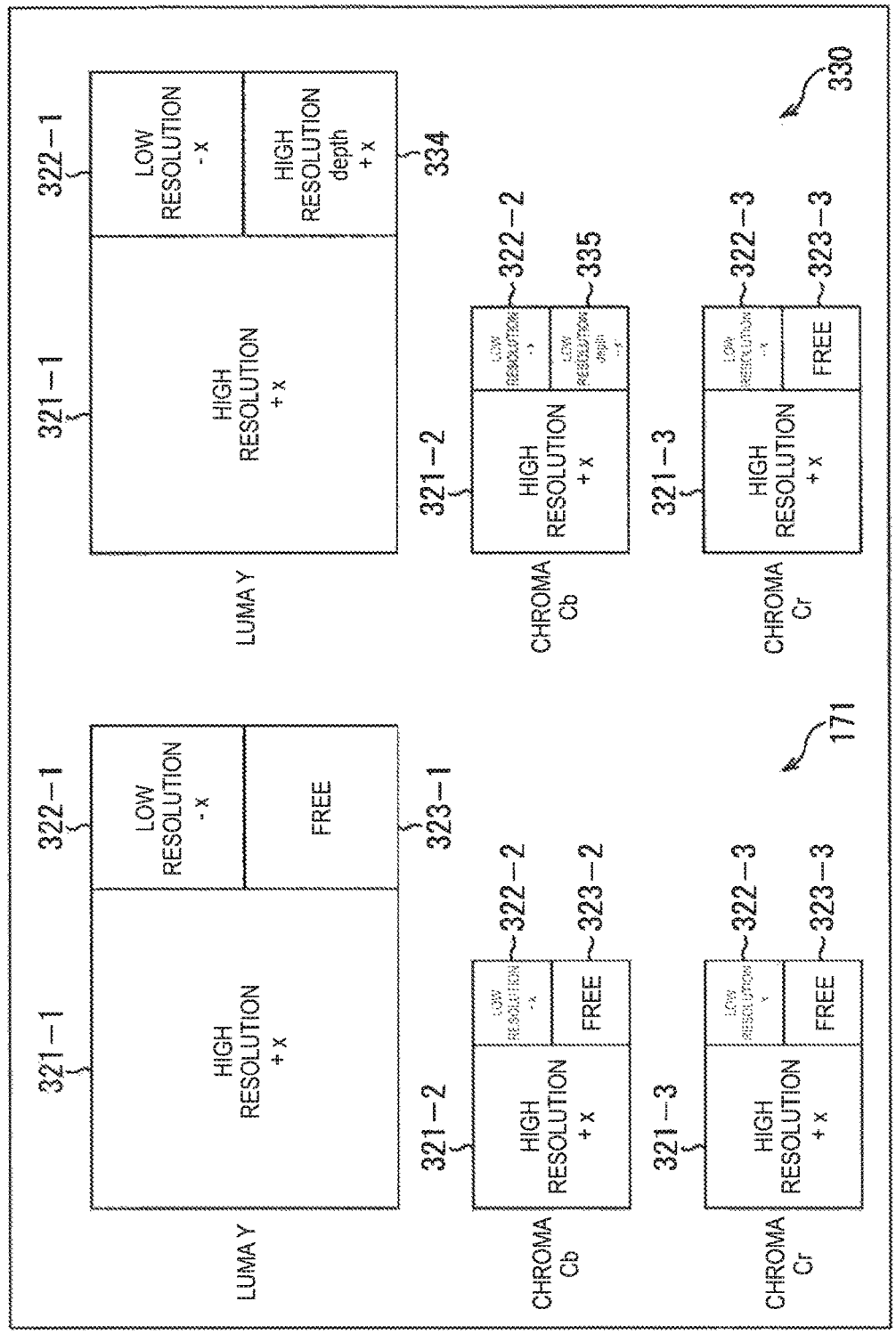
FIG. 20 is a diagram for describing a composite image generated by a combining unit of FIG. 19.

FIG. 20 is a diagram for describing the composite image of the surface 11 generated by the combining unit 315-1 of FIG. 19.

As illustrated on the left side of FIG. 20, the combining unit 155-1 (FIG. 8) of the image display system 130 combines a luma component 321-1 of the high-resolution image 161A and a luma component 322-1 of the low-resolution image 161B to generate the luma component of the composite image 171. Further, the combining unit 155-1 combines a Cb component 322-2 of the high-resolution image 161A and a Cb component 322-2 of the low-resolution image 161B to generate the Cb component of the composite image 171. Further, the combining unit 155-1 combines a Cr component 321-3 of the high-resolution image 161A and a Cr component 322-3 of the low-resolution image 161B to generate the Cr component of the composite image 171.

Here, the resolution of the low-resolution image 161 B in the horizontal direction and the vertical direction is ½ of the resolution of the high-resolution image 161A in the horizontal direction and the vertical direction. Therefore, a free space 323-1 having the same size as the luma component 322-1 of the low-resolution image 161B is generated in the luma component of the composite image 171. Similarly, free spaces 323-2 and 323-3 having the same size as the Cb component 322-2 and the Cr component 322-3 of the low-resolution image 161 B are generated in the Cb component and Cr component of the composite image 171.

Therefore, as illustrated on the right side of FIG. 20, the combining unit 315-1 arranges the parallax image 334 of the high-resolution image 161A in the free space 323-1 and arranges the parallax image 335 of the low-resolution image 161B in the free space 323-2.

Specifically, the combining unit 315-1 combines the luma component 321-1 of the high-resolution image 161A, the luma component 322-1 of the low-resolution image 161B, and the parallax image 334 of the high-resolution image 161A to generate a luma component of a composite image 330.

Further, the combining unit 315-2 combines the Cb component 321-2 of the high-resolution image 161A, the Cb component 322-2 of the low-resolution image 161B, and the parallax image 335 of the low-resolution image 161B to generate a Cb component of the composite image 330.

Further, the combining unit 315-2 combines the Cr component 321-3 of the high-resolution image 161A and the Cr component 322-3 of the low-resolution image 161B to generate a Cr component of the composite image 330.

As described above, the combining unit 315-2 arranges the parallax image 334 of the high-resolution image 161A in the free space 323-1 of the Nina component and arranges the parallax image 335 of the low-resolution image 161B in the free space 323-2 of the Cb component. Accordingly, it is possible to cause the ratio of the high-resolution image 161A and the parallax image 334 of the high-resolution image 161A to be equal to the ratio of the low-resolution image 161B and the parallax image 335 of the low-resolution image 161B.

FIG. 20 has been described focusing on the composite image 330 of the +x surface 11, but the same applies to the composite images of the surfaces 12 to 16. In the third embodiment, the parallax image of the low-resolution image is arranged in the Cb component of the composite image, but the parallax image of the low-resolution image may be arranged in the Cr component of the composite image.

(Description of Process of Content Server)

Figure 21:
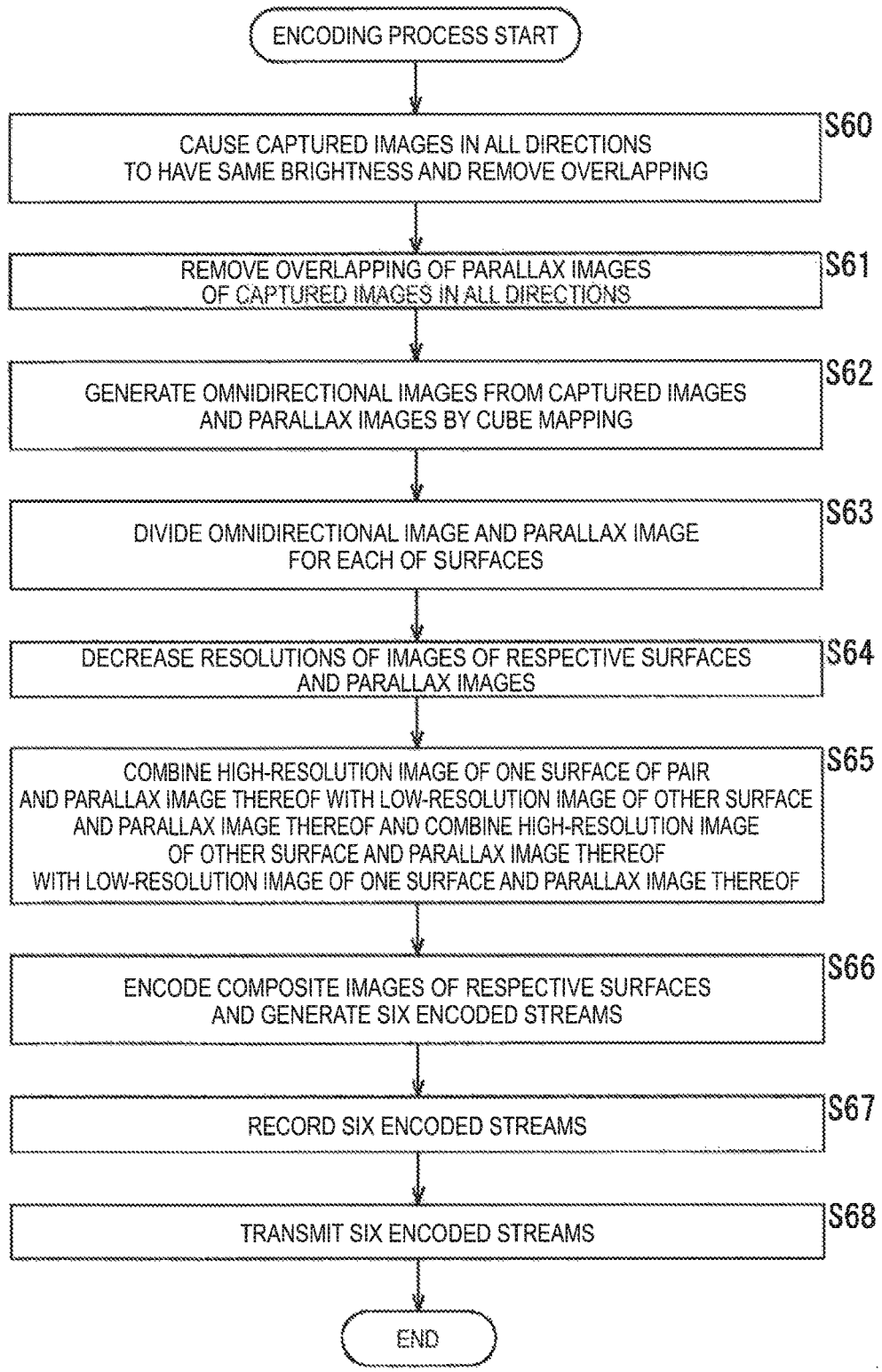
FIG. 21 is a flowchart for describing an encoding process of the content server of FIG. 19.

FIG. 21 is a flowchart for describing an encoding process of the content server 310 of FIG. 19. The encoding process is performed, for example, in units of frames.

In step S60 of FIG. 21, the stitching processing unit 311 causes the captured images in all directions supplied from the multi-camera unit to have the same color and brightness, removes overlapping thereof, and connects them. The stitching processing unit 311 supplies the resulting captured image to the mapping processing unit 312.

In step S61, the stitching processing unit 311 removes overlapping of the parallax images of the captured images in all directions supplied from the multi-camera unit, connects the resulting parallax images, and supplies the resulting image to the mapping processing unit 312.

In step S62, the mapping processing unit 312 generates the omnidirectional image 30 of the captured image from the captured images supplied from the stitching processing unit 311 by the cube mapping and supplies the omnidirectional image 30 to the dividing unit 313. Further, the mapping processing unit 312 generates the omnidirectional image of the parallax image from the parallax images supplied from the stitching processing unit 311 by the cube mapping and supplies the omnidirectional image to the dividing unit 313.

In step S63, the dividing unit 313 divides the omnidirectional image 30 of the captured image supplied from the mapping processing unit 312 for the surfaces 11 to 16 to obtain the images 31 to 36. Further, the dividing unit 313 divides the omnidirectional image of the parallax image supplied from the mapping processing unit 312 for the surfaces 11 to 16 to obtain the parallax images of the surfaces 11 to 16.

The dividing unit 313 supplies the image 31, the image 32, and the parallax images of the +x surface 11 and the -x surface 12 to the resolution decreasing unit 314-1, and supplies the image 33, the image 34, and the parallax images of the +y surface 13 and the -y surface 14 to the resolution decreasing unit 314-2. The dividing unit 313 supplies the image 35, the image 36, and the parallax images of the +z surface 15 and the -z surface 16 to the resolution decreasing unit 314-3.

The resolution decreasing unit 314-1 supplies the images of the +x surface 11 and the -x surface 12 supplied from the dividing unit 313 to the combining unit 315-1 as the high-resolution image 161A and the high-resolution image 162A without change. Similarly, the resolution decreasing unit 314-2 supplies the high-resolution image 163A and the high-resolution image 164A to the combining unit 315-2, and the resolution decreasing unit 314-3 supplies the high-resolution image 165A and the high-resolution image 166A to the combining unit 315-3.

In step S64, the resolution decreasing unit 314-1 decreases the resolutions of the image 31, the image 32, and the parallax images of the image 31 and the image 32. Then, the resolution decreasing unit 314-1 supplies the parallax images of the low-resolution image 161B, the low-resolution image 162B, the high-resolution image 161A, and the high-resolution image 162A and the parallax images of the low-resolution image 161B and the low-resolution image 162B which are obtained accordingly to the combining unit 315-1.

Similarly, the resolution decreasing unit 314-2 generates the parallax images of the low-resolution image 163B, the low-resolution image 164B, the high-resolution image 163A, and the high-resolution image 164A and the parallax images of the low-resolution image 163B and the low-resolution image 164B and supplies the parallax images to the combining unit 315-2. Further, the resolution decreasing unit 314-3 generates the parallax images of the low-resolution image 165B, the low-resolution image 166B, the high-resolution image 165A, and the high-resolution image 166A and the parallax images of the low-resolution image 165B and the low-resolution image 166B, and supplies the parallax images to the combining unit 315-3.

In step S65, the combining unit 315-1 combines the high-resolution image 161A of the +x surface 11 which is one surface of the pair of the +x surface 11 and the -x surface 12 and the parallax image of the high-resolution image 161A with the low-resolution image 162B of the -x surface 12 which is the other surface and the parallax image of the low-resolution image 162B to generate the composite image of the +x surface 11. Then, the combining unit 315-1 supplies the composite image of the +x surface 11 to the encoder 156-1. Further, the combining unit 315-1 combines the high-resolution image 162A of the -x surface 12 which is the other surface and the parallax image of the high-resolution image 162A with the low-resolution image 161B of the +x surface 11 which is one surface and the parallax image of the low-resolution image 161B to generate the composite image of the -x surface 12. Then, the combining unit 315-1 supplies the composite image of the -x surface to the encoder 156-2.

Similarly, the combining unit 315-2 generates the composite image of the +y surface 13 and supplies the composite image to the encoder 156-3, and generates the composite image of the -y surface 14 and supplies the composite image to the encoder 156-3. Further, the combining unit 315-3 generates the composite image of the +z surface 15 and supplies the composite image to the encoder 156-5, and generates the composite image of the -z surface 16 and supplies the composite image to the encoder 156-6.

A process of steps S66 to S68 is similar to the process of steps S16 to S18 of FIG. 11, and thus description thereof is omitted.

(Exemplary configuration of Home Server)

Figure 22:
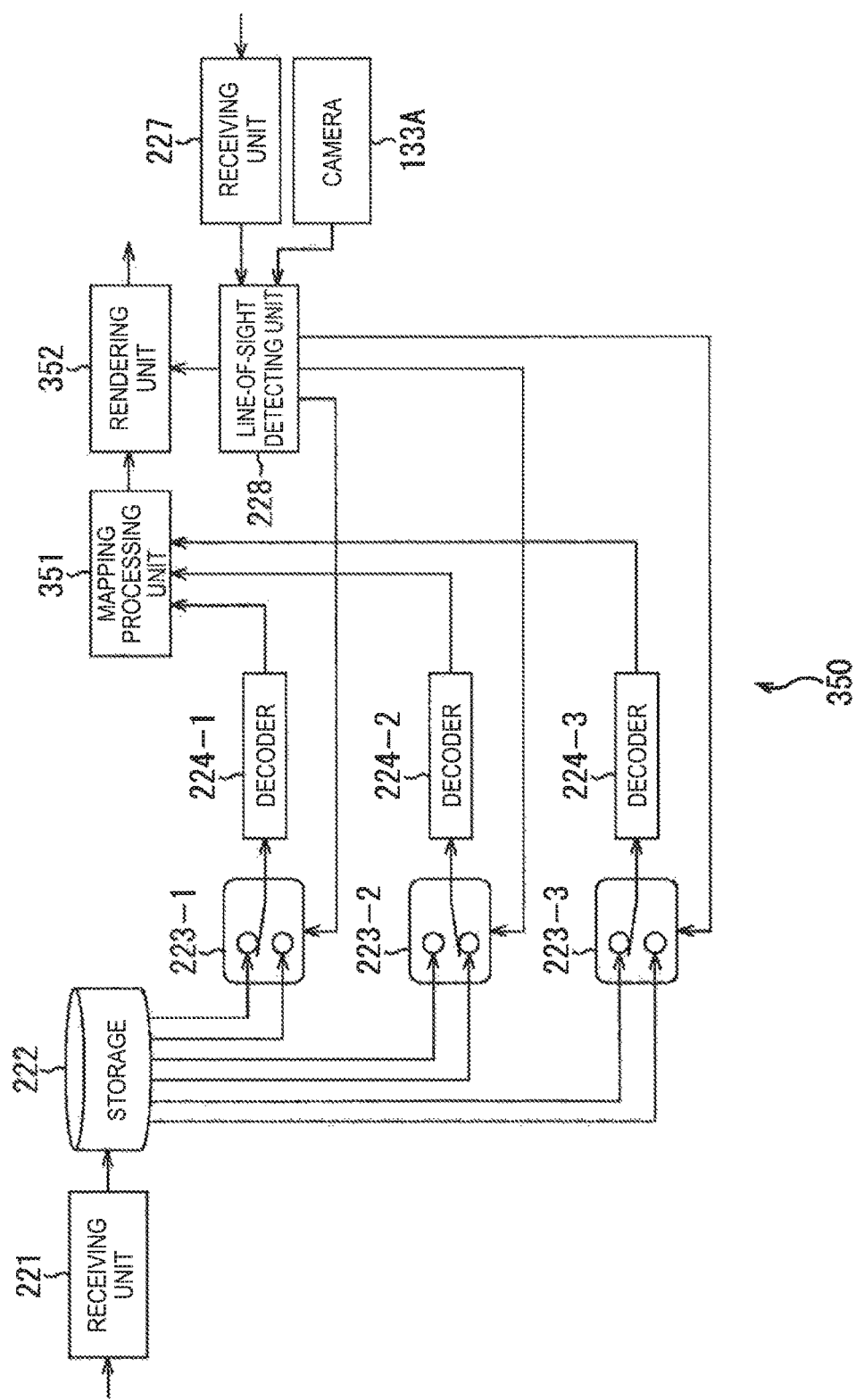
FIG. 22 is a block diagram illustrating an exemplary configuration of a content server of a third embodiment of the image display system to which the present disclosure is applied.

FIG. 22 is a block diagram illustrating an exemplary configuration of the content server of the third embodiment of the image display system to which the present disclosure is applied.

In a configuration illustrated in FIG. 22, the same parts as those of FIG. 12 are denoted by the same reference numerals. A repeated description will be appropriately omitted.

A configuration of a home server 350 of FIG. 22 differs from the configuration of the home server 133 of FIG. 12 in that a mapping processing unit 351 and a rendering unit 352 are arranged instead of the mapping processing unit 225 and the rendering unit 226. The home server 350 generates a display image for the left eye and a display image for the right eye on the basis of the parallax images of the surfaces 11 to 16.

Specifically, the mapping processing unit 351 separates the low-resolution image, the high-resolution image, the parallax image of the low-resolution image, and the high-resolution image that are included in each of the composite images of the three surfaces supplied from the decoders 224-1 to 224-3. Accordingly, the high-resolution images of the three surfaces, the parallax images of the high resolution, the low-resolution images of three surfaces which are opposite to the three surfaces, and the parallax images of the low resolution are generated.

Then, the mapping processing unit 351 generates a cube image by mapping the high-resolution images of the three surfaces and the low-resolution images of the three surfaces to the surfaces 11 to 16 of the cube 10 as the textures. Further, the mapping processing unit 351 generates a cube parallax image by mapping the parallax images of the high-resolution images of the three surfaces and the parallax images of the low-resolution images of the three surfaces to the surfaces 11 to 16 of the cube as the textures. The mapping processing unit 351 supplies the cube image and the cube parallax image to the rendering unit 352.

The rendering unit 352 generates the image of the field-of-view range of the user as the display image by projecting the cube image supplied from the mapping processing unit 351 in the field-of-view range of the user supplied from the line-of-sight detecting unit 228. Further, the rendering unit 352 generating a parallax image of the display image by projecting the cube parallax image supplied from the mapping processing unit 351 in the field-of-view range of the user. The rendering unit 352 generates a display image for the left eye and a display image for the right eye which constitute a 3D image by shifting the display image in the horizontal direction on the basis of the parallax image of the display image.

The rendering unit 352 transmits the display image for the left eye and the display image for the right eye to the head mounted display 135 via the HDMI cable and the converting device 134 of FIG. 7. As a result, the head mounted display 135 displays the display image for the left eye and the display image for the right eye so that the left eye of the user views the display image for the left eye, and the right eye views the display image for the right eye. Accordingly, the user can view the 3D image.

(Description of Process of Home Server)

Figure 23:
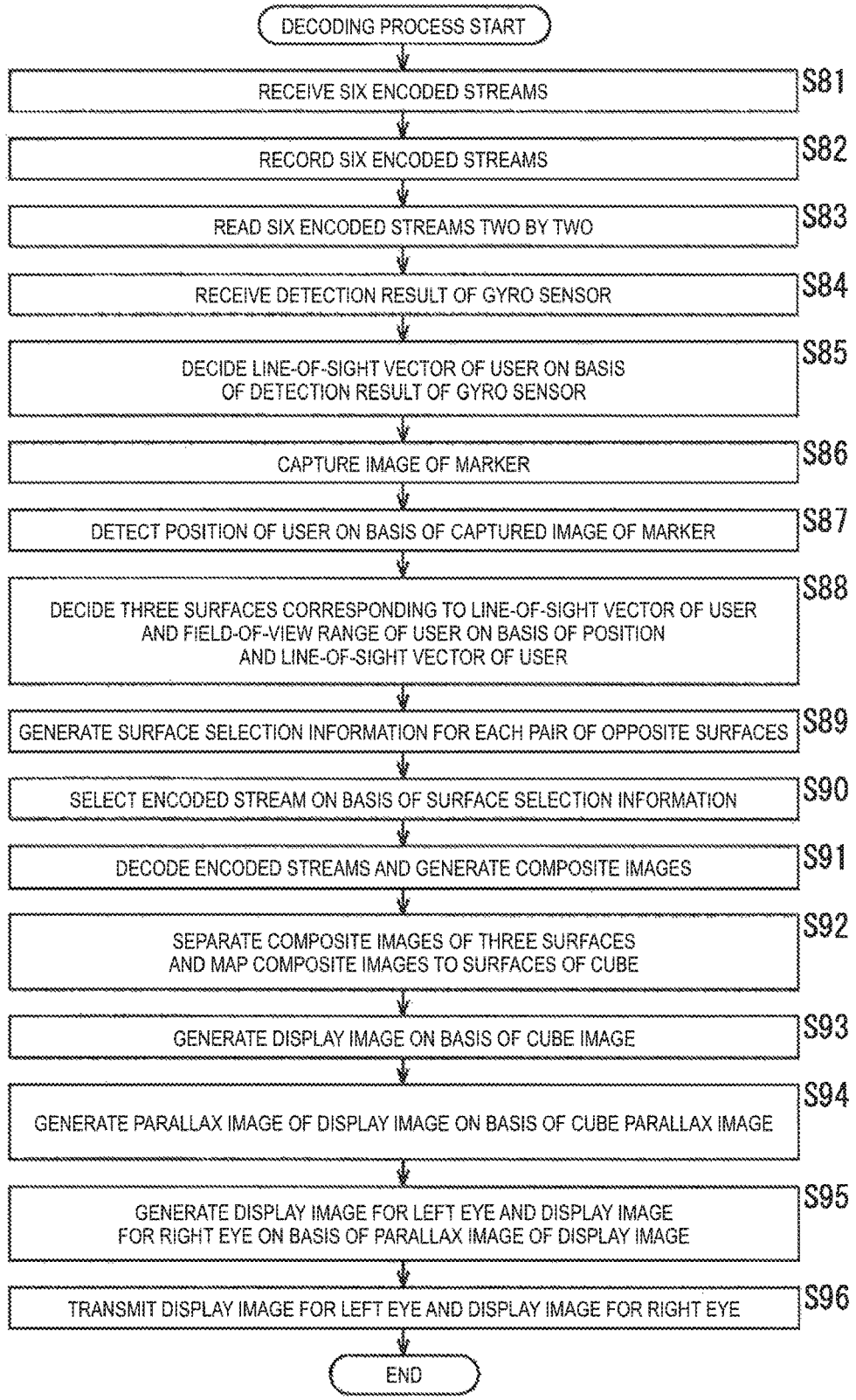
FIG. 23 is a flowchart for describing a decoding process of the home server of FIG. 22.

FIG. 23 is a flowchart illustrating a decoding process of the home server 350 of FIG. 22.

A processing of steps S81 to S91 of FIG. 23 is similar to the process of steps S31 to S41 of FIG. 17, and thus description thereof is omitted.

In step S92, the mapping processing unit 351 separates the low-resolution image, the high-resolution image, the parallax image of the low-resolution image, and the high-resolution image that are included in each of the composite images of the three surfaces supplied from the decoders 224-1 to 224-3. Accordingly, the high-resolution images of the three surfaces, the parallax images of the high resolution, the low-resolution images of three surfaces which are opposite to the three surfaces, and the parallax images of the low resolution are generated.

Then, the mapping processing unit 351 generates a cube image by mapping the high-resolution images of the three surfaces and the low-resolution images of the three surfaces to the surfaces 11 to 16 of the cube 10 as the textures. Further, the mapping processing unit 351 generates a cube parallax image by mapping the parallax images of the high-resolution images of the three surfaces and the parallax images of the low-resolution images of the three surfaces to the surfaces 11 to 16 of the cube as the textures. The mapping processing unit 351 supplies the cube image and the cube parallax image to the rendering unit 352.

In step S93, the rendering unit 352 generates the image of the field-of-view range of the user as the display image on the basis of the cube image supplied from the mapping processing unit 351 and the field-of-view range of the user supplied from the line-of-sight detecting unit 228. In step S94, the rendering unit 352 generates the parallax image of the display image on the basis of the cube parallax image supplied from the mapping processing unit 351 and the field-of-view range of the user.

In step S95, the rendering unit 352 generates the display image for the left eye and the display image for the right eye which constitute the 3D image by shifting the display image in the horizontal direction on the basis of the parallax image of the display image.

In step S96, the rendering unit 352 transmits the display image for the left eye and the display image for the right eye to the converting device 134 of FIG. 7 via the HDMI cable, and then the process ends.

As described above, in the third embodiment of the image display system, since the parallax image is included in the composite image, the parallax image can be recorded and reproduced through encoders and decoders which correspond in number to encoders and decoders in the first embodiment.

<Fourth Embodiment>

(Exemplary Configuration of the Fourth Embodiment of the Image Display System)

Figure 24:
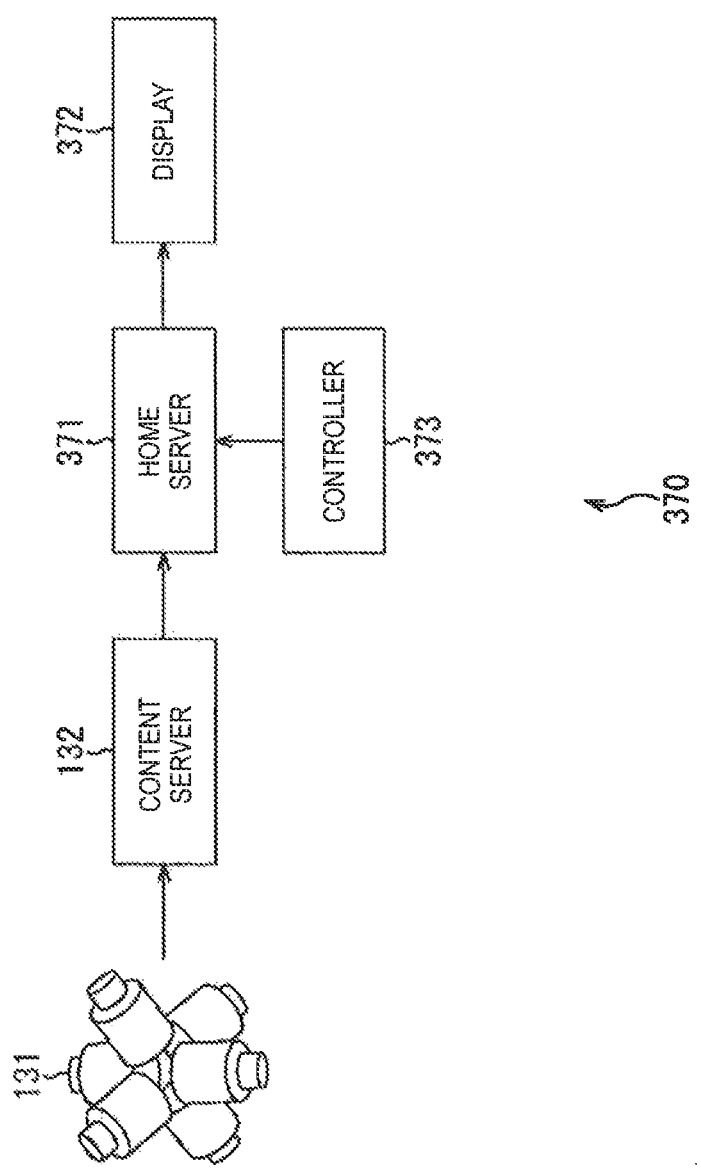
FIG. 24 is a block diagram illustrating an exemplary configuration of a fourth embodiment of the image display system to which the present disclosure is applied.

FIG. 24 is a block diagram illustrating an exemplary configuration of a fourth embodiment of the image display system to which the present disclosure is applied.

In a configuration illustrated in FIG. 24, the same parts as those of FIG. 7 are denoted by the same reference numerals. A repeated description will be appropriately omitted.

A configuration of an image display system 370 of FIG. 24 differs from that of the image display system 130 of FIG. 7 in that instead of the home server 133 and the head mounted display 135, a home server 371 and a display 372 are arranged, a converting device 134 is not provided, and a controller 373 is arranged.

In the image display system 370, the user inputs the position of the user and the line-of-sight vector by operating the controller 373, and the display image corresponding thereto is displayed on the display 372.

Specifically, the home server 371 of the image display system 370 receives the six encoded streams transmitted from the content server 132. The home server 371 receives an indication of the position of the user and the line-of-sight vector from the controller 373.

Similarly to the home server 133 of FIG. 7, the home server 371 decides the three surfaces corresponding to the line-of-sight vector of the user among the surfaces 11 to 16 on the basis of the line-of-sight vector of the user. Then, the home server 371 selects and decodes the three encoded streams of the composite images including the high-resolution images of the surfaces corresponding to the line-of-sight vector of the user among the six encoded streams.

Further, similarly to the home server 133, the home server 371 decides the field-of-view range of the user on the basis of the position of the user and the line-of-sight vector. The home server 371 generates the image of the field-of-view range of the user as the display image from the composite image obtained as a result of decoding. The home server 371 transmits the display image to the display 372 via an HDMI cable (not illustrated).

The display 372 displays the display image supplied from the home server 371.

The controller 373 includes an operation button or the like. When the user inputs the position of the user and the line-of-sight vector by operating the operation button or the like, the controller 373 receives the input and gives an indicating of the position of the user and the line-of-sight vector to the home server 371.

The controller 373 and the display 372 may be integrated. In this case, for example, the controller 373 and the display 372 are configured with a mobile terminal such as a mobile phone or a tablet type terminal, a part of a personal computer, or the like. Further, the controller 373 may include a gyro sensor, an acceleration sensor, a geomagnetic sensor, or the like, and the line-of-sight vector of the user may be decided on the basis of the detection result of any one of these sensors.

<Description of Method of Generating Omnidirectional Image Corresponding to High-Resolution Image and Low-Resolution Image>

FIG. 25 is a diagram for describing a method of generating the omnidirectional image corresponding to the high-resolution image and the low-resolution image of the present disclosure.

As illustrated in FIG. 25, when the cube mapping and the equidistant cylindrical projection are used as the method of generating the omnidirectional image, there are four patterns as a combination of methods of generating the omnidirectional image corresponding to the high-resolution image and the low-resolution image.

Specifically, a first pattern is a pattern in which the method of generating the omnidirectional image corresponding to the high-resolution image is the cube mapping, and the method of generating the omnidirectional image corresponding to the low-resolution image is the equidistant cylindrical projection. The second pattern is a pattern in which both the method of generating the omnidirectional images corresponding to the high-resolution image and the method of generating the omnidirectional images corresponding to the low-resolution image are the cube mapping. A third pattern is a pattern in which both the method of generating the omnidirectional images corresponding to the high-resolution image and the method of generating the omnidirectional images corresponding to the low-resolution image are the equidistant cylindrical projection. A fourth pattern is a pattern where the method of generating the omnidirectional image corresponding to the high-resolution image is the equidistant cylindrical projection, and the method of generating the omnidirectional image corresponding to the low-resolution image is the cube mapping.

The pattern of the method of generating the omnidirectional images corresponding to the high-resolution image and the low-resolution image according to the present disclosure is the second and third patterns among the first to fourth patterns. In the second pattern, a pixel density of the cube image is almost uniform, and an image quality of the display image is excellent. The third pattern is excellent in compatibility with an existing image display system in which the omnidirectional image generated using the equidistant cylindrical projection is encoded into one encoded stream.

<Fifth Embodiment>

(Description of Computer to Which Present Disclosure is Applied)

A series of processes of the content server 132 (310) or the home server 133 (350, 371) described above can be executed by hardware or software. When a series of processes is executed by software, a program constituting the software is installed in a computer. Here, examples of the computer include a computer incorporated in dedicated hardware and a general-purpose personal computer which is capable of executing various kinds of functions when various kinds of programs are installed therein.

FIG. 26 is a block diagram illustrating an exemplary hardware configuration of a computer that executes a series of processing described above by a program.

In a computer 900, a central processing unit (CPU) 901, a read only memory (ROM) 902, and a random access memory (RAM) 903 are connected to one another by a bus 904.

An input/output interface 905 is further connected to the bus 904. An input unit 906, an output unit 907, a storage unit 908, a communication unit 909, and a drive 910 are connected to the input/output interface 905.

The input unit 906 includes a keyboard, a mouse, a microphone, or the like. The output unit 907 includes a display, a speaker, or the like. The storage unit 908 includes a hard disk, a nonvolatile memory, or the like. The communication unit 909 includes a network interface or the like. The drive 910 drives a removable medium 911 such as a magnetic disk, an optical disk, a magneto-optical disk, or a semiconductor memory.

In the computer 900 configured as described above, the CPU 901 loads a program that is stored, for example, in the storage unit 908 onto the RAM 903 via the input/output interface 905 and the bus 904, and executes the program, Thus, the above-described series of processing is performed.

Programs to be executed by the computer 900 (the CPU 901) are provided being recorded in the removable medium 911 which is a packaged medium or the like. Also, programs may be provided via a wired or wireless transmission medium, such as a local area network, the Internet or digital satellite broadcasting.

In the computer 900, by inserting the removable medium 911 into the drive 910, the program can be installed in the storage unit 908 via the input/output interface 905. Further, the program can be received by the communication unit 909 via a wired or wireless transmission medium and installed in the storage unit 908. Moreover, the program can be installed in advance in the ROM 902 or the storage unit 908.

It should be noted that the program executed by the computer 900 may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in different casings and connected through a network, or a plurality of modules within a single casing.

In addition, the effects described in the present specification are not limiting but are merely examples, and there may be additional effects.

An embodiment of the disclosure is not limited to the embodiments described above, and various changes and modifications may be made without departing from the scope of the disclosure.

For example, the ratio of the resolution of the low-resolution image to the resolution of the high-resolution image may not be ¼. Preferably, the resolution of the high-resolution image is higher than the resolution of the low-resolution image, and the high-resolution image may be generated by converting the resolution of the omnidirectional image.

Further, in the third and fourth embodiments, similarly to the second embodiment, the method of generating the omnidirectional image may be the equidistant cylindrical projection. In the fourth embodiment, similarly to the third embodiment, the parallax image may be included in the composite image.

Furthermore, the 3D model may be a regular polyhedron such as a regular dodecahedron or a regular icosahedron in addition to a sphere or a cube. Further, the captured image may be a still image or a moving image.

Further, the content server 132 (310) may transmit the encoded stream to the home server 133 (350, 371) without change without recording the encoded stream. The encoders 156-1 to 156-6 may be arranged outside the content server 132 (310).

Furthermore, the size of the 3D model that is mapped when the omnidirectional image is generated and the size of 3D model that is mapped when the cube image or the cube parallax image is generated may be different.

The present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present disclosure may also be configured as below.

(1)
An image processing device, including:
an encoding unit configured to encode, for a pair of opposite surfaces among a plurality of surfaces of a model for an omnidirectional image, a first composite image obtained by combining the omnidirectional image of a first surface of a first resolution and the omnidirectional image of a second surface of a second resolution lower than the first resolution and a second composite image obtained by combining the omnidirectional image of the second surface of the first resolution and the omnidirectional image of the first surface of the second resolution.

(2)
The image processing device according to (1),
in which the encoding unit encodes the first composite image obtained by combining the omnidirectional image of the first surface of the first resolution, the omnidirectional image of the second surface of the second resolution, and a parallax image of the first surface of a third resolution and the second composite image obtained by combining the omnidirectional image of the second surface of the first resolution, the omnidirectional image of the first surface of the second resolution, and a parallax image of the second surface of the third resolution.

(3)
The image processing device according to (2),
in which the encoding unit encodes a luma component of the first composite image obtained by combining a luma component of the omnidirectional image of the first surface of the first resolution, a luma component of the omnidirectional image of the second surface of the second resolution, and a parallax image of the first surface of the third resolution and a luma component of the second composite image obtained by combining a luma component of the omnidirectional image of the second surface of the first resolution, a luma component of the omnidirectional image of the first surface of the second resolution, and a parallax image of the second surface of the third resolution.

(4)
The image processing device according to (2) or (3),
in which the second and third resolutions are ¼ of the first resolution.

(5)
The image processing device according to (1),
in which the encoding unit encodes a chroma component of the first composite image obtained by combining a chroma component of the omnidirectional image of the first surface of the first resolution, a chroma component of the omnidirectional image of the second surface of the second resolution, and a parallax image of the second surface of the third resolution and a chroma component of the second composite image obtained by combining a chroma component of the omnidirectional image of the second surface of the first resolution, a chroma component of the omnidirectional image of the first surface of the second resolution, and a parallax image of the first surface of the third resolution.

(6)
The image processing device according to any of (1) to (5), further including:
a generating unit configured to generate the first composite image and the second composite image.

(7)
The image processing device according to any of (1) to (6), further including:
a converting unit configured to convert the resolutions of the omnidirectional images of the first surface and the second surface into the second resolution.

(8)
The image processing device according to any of (1) to (7), further including:
a storage unit configured to store the encoded stream generated by the encoding; and
a delivering unit configured to deliver the encoded stream stored in the storage unit to a terminal that decodes the encoded stream.

(9)
The image processing device according to any of (1) to (8),
in which the encoding unit encodes the first composite image and the second composite image in accordance with an AVC/H.264 standard or an HEVC/H.265 standard.

(10)
The image processing device according to any of (1) to (9),
in which the omnidirectional image is an image generated by cube mapping or an image generated by equidistant cylindrical projection.

(11)
An image processing method, including:
an encoding step of encoding, by an image processing device, for a pair of opposite surfaces among a plurality of surfaces of a model for an omnidirectional image, a first composite image obtained by combining the omnidirectional image of a first surface of a first resolution and the omnidirectional image of a second surface of a second resolution lower than the first resolution and a second composite image obtained by combining the omnidirectional image of the second surface of the first resolution and the omnidirectional image of the first surface of the second resolution.

(12)
An image processing device, including:
a decoding unit configured to decode, for a pair of opposite surfaces among a plurality of surfaces of a model for an omnidirectional image, an encoded stream obtained by combining the omnidirectional image of a first resolution of a surface corresponding to a line-of-sight direction of a user out of an encoded stream of a first composite image obtained by combining the omnidirectional image of a first surface of the first resolution and the omnidirectional image of a second surface of a second resolution lower than the first resolution and an encoded stream of a second composite image obtained by combining the omnidirectional image of the second surface of the first resolution and the omnidirectional image of the first surface of the second resolution.

(13)
The image processing device according to (12),
in which the first composite image is an image obtained by combining the omnidirectional image of the first surface of the first resolution, the omnidirectional image of the second surface of the second resolution, and a parallax image of the first surface of a third resolution, and
the second composite image is an image obtained by combining the omnidirectional image of the second surface of the first resolution, the omnidirectional image of the first surface of the second resolution, and a parallax image of the second surface of the third resolution.

(14)
The image processing device according to (13),
in which the decoding unit decodes an encoded stream obtained by combining a luma component of the omnidirectional image of the first resolution of the surface corresponding to the line-of-sight direction out of an encoded stream of a luma component of the first composite image obtained by combining a luma component of the omnidirectional image of the first surface of the first resolution, a luma component of the omnidirectional image of the second surface of the second resolution, and a parallax image of the first surface of the third resolution and an encoded stream of a luma component of the second composite image obtained by combining a luma component of the omnidirectional image of the second surface of the first resolution, a luma component of the omnidirectional image of the first surface of the second resolution, and a parallax image of the second surface of the third resolution.

(15)
The image processing device according to (13) or (14),
in which the second and third resolutions are ¼ of the first resolution.

(16)
The image processing device according to (12),
in which the decoding unit decodes an encoded stream obtained by combining a chroma component of the omnidirectional image of the first resolution of the surface corresponding to the line-of-sight direction out of an encoded stream of a chroma component of the first composite image obtained by combining a chroma, component of the omnidirectional image of the first surface of the first resolution, a chroma component of the omnidirectional image of the second surface of the second resolution, and a parallax image of the second surface of the third resolution and an encoded stream of a chroma component of the second composite image obtained by combining a chroma component of the omnidirectional image of the second surface of the first resolution, a chroma component of the omnidirectional image of the first surface of the second resolution, and a parallax image of the first surface of the third resolution.

(17)
The image processing device according to any of (12) to (16), further including:
a separating unit configured to separate the first composite image or the second composite image obtained as a result of the decoding.

(18)
The image processing device according to any of (12) to (17),
in which the encoded streams of the first arid second composite images are the first and second composite images encoded in accordance with an AVC/H.264 standard or an HEVC/H.265 standard.

(19)
The image processing device according to any of (12) to (18),
in which the omnidirectional image is an image generated by cube mapping or an image generated by equidistant cylindrical projection.

(20)
An image processing method, including:
a decoding step of decoding, by an image processing device, for a pair of opposite surfaces among a plurality of surfaces of a model for an omnidirectional image, an encoded stream obtained by combining the omnidirectional image of a first resolution of a surface corresponding to a line-of-sight direction of a user out of an encoded stream of a first composite image obtained by combining the omnidirectional image of a first surface of the first resolution and the omnidirectional image of a second surface of a second resolution lower than the first resolution and an encoded stream of a second composite image obtained by combining the omnidirectional image of the second surface of the first resolution and the omnidirectional image of the first surface of the second resolution.

REFERENCE SIGNS LIST 10 cube
11 to 16 surface
30 omnidirectional image
70 sphere
71 to 78 surface
90 omnidirectional image
132 content server
133 home server
154-1 to 154-3 resolution decreasing unit
155-1 to 155-3 combining unit
156-1 to 156-6 encoder
161B to 166B low-resolution image
171 to 176 composite image
224-1 to 224-3 decoders
310 content server
314-1 to 314-3 resolution decreasing unit
315-1 to 315-3 combining unit
321-1, 322-1 luma component
334, 335 parallax image
350 home server
371 home server

The invention claimed is:

1. An image processing device, comprising:
a combining unit configured to generate, for a pair of opposite surfaces among a plurality of surfaces of a model for an omnidirectional image, a first composite image by combining the omnidirectional image of a first surface, of the pair of opposite surfaces, of a first resolution and the omnidirectional image of a second surface, of the pair of opposite surfaces, of a second resolution lower than the first resolution and a second composite image by combining the omnidirectional image of the second surface of the first resolution and the omnidirectional image of the first surface of the second resolution; and
an encoding unit configured to
encode, for generating an image of a field-of-view range of a user corresponding to a line-of-sight direction of the user, the first composite image and the second composite image, and generate encoded streams of the first composite image and the second composite image, wherein each of the first composite image and the second composite image include only images with respect to the first surface and the second surface, and wherein the combining unit and the encoding unit are each implemented via at least one processor.

2. The image processing device according to claim 1, wherein the encoding unit encodes the first composite image obtained by combining the omnidirectional image of the first surface of the first resolution, the omnidirectional image of the second surface of the second resolution, and a parallax image of the first surface of a third resolution and the second composite image obtained by combining the omnidirectional image of the second surface of the first resolution, the omnidirectional image of the first surface of the second resolution, and a parallax image of the second surface of the third resolution.

3. The image processing device according to claim 2, wherein the encoding unit encodes a luma component of the first composite image obtained by combining a luma component of the omnidirectional image of the first surface of the first resolution, a luma component of the omnidirectional image of the second surface of the second resolution, and a parallax image of the first surface of the third resolution and a luma component of the second composite image obtained by combining a luma component of the omnidirectional image of the second surface of the first resolution, a luma component of the omnidirectional image of the first surface of the second resolution, and a parallax image of the second surface of the third resolution.

4. The image processing device according to claim 2, wherein the second and third resolutions are ¼ of the first resolution.

5. The image processing device according to claim 2, wherein the encoding unit encodes a chroma component of the first composite image obtained by combining a chroma component of the omnidirectional image of the first surface of the first resolution, a chroma component of the omnidirectional image of the second surface of the second resolution, and a parallax image of the second surface of the third resolution and a chroma component of the second composite image obtained by combining a chroma component of the omnidirectional image of the second surface of the first resolution, a chroma component of the omnidirectional image of the first surface of the second resolution, and a parallax image of the first surface of the third resolution.

6. The image processing device according to claim 1, further comprising:

a generating unit configured to generate the first composite image and the second composite image, wherein the generating unit is implemented via at least one processor.

7. The image processing device according to claim 1, further comprising:

a converting unit configured to convert the resolutions of the omnidirectional images of the first surface and the second surface into the second resolution, wherein the converting unit is implemented via at least one processor.

8. The image processing device according to claim 1, further comprising:

a non-transitory computer-readable medium configured to store the encoded streams generated by the encoding unit; and a delivering unit configured to deliver the encoded streams stored in the non-transitory computer-readable medium to a terminal that decodes the encoded streams, wherein the delivering unit is implemented via at least one processor.

9. The image processing device according to claim 1, wherein the encoding unit encodes the first composite image and the second composite image in accordance with an AVC/H.264 standard or an HEVC/H.265 standard.

10. The image processing device according to claim 1, wherein the omnidirectional image is an image generated by cube mapping or an image generated by equidistant cylindrical projection.

11. The image processing device according to claim 1, wherein the encoding unit is further configured to generate, for each pair of opposite surfaces among a plurality of pairs of opposite surfaces of the model for the omnidirectional image, the first composite image and the second composite image, a number of the composite images of the plurality of pairs of opposite surfaces being equal to a number of the plurality of surfaces of the model for the omnidirectional image.

12. An image processing method, comprising:

generating, by an image processing device, for a pair of opposite surfaces among a plurality of surfaces of a model for an omnidirectional image, a first composite image by combining the omnidirectional image of a first surface, of the pair of opposite surfaces, of a first resolution and the omnidirectional image of a second surface, of the pair of opposite surfaces, of a first resolution and the omnidirectional image of a second surface, of the pair of opposite surfaces, of a second resolution lower than the first resolution and a second composite image by combining the omnidirectional image of the second surface of the first resolution and the omnidirectional image of the first surface of the second resolution;

encoding, for generating an image of a field-of-view range of a user corresponding to a line-of-sight direction of the user, the first composite image and the second composite image; and generating encoded streams of the first composite image and the second composite image, wherein each of the first composite image and the second composite image include only images with respect to the first surface and the second surface.

13. An image processing device, comprising:

a decoding unit configured to decode, for a pair of opposite surfaces among a plurality of surfaces of a model for an omnidirectional image, an encoded stream obtained by combining the omnidirectional image of a first resolution of a surface corresponding to a line-of-sight direction of a user out of an encoded stream of a first composite image obtained by combining the omnidirectional image of a first surface, of the pair of opposite surfaces, of the first resolution and the omnidirectional image of a second surface, of the pair of opposite surfaces, of a second resolution lower than the first resolution and an encoded stream of a second composite image obtained by combining the omnidirectional image of the second surface of the first resolution and the omnidirectional image of the first surface of the second resolution; and a rendering unit configured to generate an image of a field-of-view range of the user corresponding to the line-of-sight direction of the user by using the decoded streams, wherein each of the first composite image and the second composite image include only images with respect to the first surface and the second surface, and wherein the decoding unit and the rendering unit are each implemented via at least one processor.

14. The image processing device according to claim 13, wherein the first composite image is an image obtained by combining the omnidirectional image of the first surface of the first resolution, the omnidirectional image of the second surface of the second resolution, and a parallax image of the first surface of a third resolution, and the second composite image is an image obtained by combining the omnidirectional image of the second surface of the first resolution, the omnidirectional image of the first surface of the second resolution, and a parallax image of the second surface of the third resolution.

15. The image processing device according to claim 14, wherein the decoding unit decodes an encoded stream obtained by combining a luma component of the omnidirectional image of the first resolution of the surface corresponding to the line-of-sight direction out of an encoded stream of a luma component of the first composite image obtained by combining a luma component of the omnidirectional image of the first surface of the first resolution, a luma component of the omnidirectional image of the second surface of the second resolution, and a parallax image of the first surface of the third resolution and an encoded stream of a luma component of the second composite image obtained by combining a luma component of the omnidirectional image of the second surface of the first resolution, a luma component of the omnidirectional image of the first surface of the second resolution, and a parallax image of the second surface of the third resolution.

16. The image processing device according to claim 14, wherein the second and third resolutions are ¼ of the first resolution.

17. The image processing device according to claim 14, wherein the decoding unit decodes an encoded stream obtained by combining a chroma component of the omnidirectional image of the first resolution of the surface corresponding to the line-of-sight direction out of an encoded stream of a chroma component of the first composite image obtained by combining a chroma component of the omnidirectional image of the first surface of the first resolution, a chroma component of the omnidirectional image of the second surface of the second resolution, and a parallax image of the second surface of the third resolution and an encoded stream of a chroma component of the second composite image obtained by combining a chroma component of the omnidirectional image of the second surface of the first resolution, a chroma component of the omnidirectional image of the first surface of the second resolution, and a parallax image of the first surface of the third resolution.

18. The image processing device according to claim 13, further comprising:

a separating unit configured to separate the first composite image or the second composite image obtained as a result of the decoding, wherein the separating unit is implemented via at least one processor.

19. The image processing device according to claim 13, wherein the encoded streams of the first and second composite images are the first and second composite images encoded in accordance with an AVC/H.264 standard or an HEVC/H.265 standard.

20. The image processing device according to claim 13, wherein the omnidirectional image is an image generated by cube mapping or an image generated by equidistant cylindrical projection.

21. The image processing device according to claim 13, wherein the encoding unit is further configured to decode, for each pair of opposite surfaces among a plurality of pairs of opposite surfaces of the model for the omnidirectional image, the first composite image and the second composite image, a number of the composite images of the plurality of pairs of opposite surfaces being equal to a number of the plurality of surfaces of the model for the omnidirectional image.

22. An image processing method, comprising:

decoding, by an image processing device, for a pair of opposite surfaces among a plurality of surfaces of a model for an omnidirectional image, an encoded stream obtained by combining the omnidirectional image of a first resolution of a surface corresponding to a line-of-sight direction of a user out of an encoded stream of a first composite image obtained by combining the omnidirectional image of a first surface, of the pair of opposite surfaces, of the first resolution and the omnidirectional image of a second surface, of the pair of opposite surfaces, of a second resolution lower than the first resolution and an encoded stream of a second composite image obtained by combining the omnidirectional image of the second surface of the first resolution and the omnidirectional image of the first surface of the second resolution; and generating, by the image processing device, an image of a field-of-view range of the user corresponding to the line-of-sight direction of the user by using the decoded streams, wherein each of the first composite image and the second composite image include only images with respect to the first surface and the second surface.

* * * * *